United States Patent
Cali et al.

(10) Patent No.: US 8,715,121 B2
(45) Date of Patent: *May 6, 2014

(54) OVERRUNNING ISOLATING DECOUPLER PULLEYS

(75) Inventors: Connard Cali, Pleasanton, CA (US);
Carlos Ferreira, Santa Catarina (BR)

(73) Assignee: Conntechnical Industries, Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/559,997

(22) Filed: Jul. 27, 2012

(65) Prior Publication Data

US 2012/0295746 A1   Nov. 22, 2012

Related U.S. Application Data

(63) Continuation of application No. 13/107,324, filed on May 13, 2011, now Pat. No. 8,292,766.

(60) Provisional application No. 61/334,847, filed on May 14, 2010, provisional application No. 61/366,374, filed on Jul. 21, 2010, provisional application No. 61/419,052, filed on Dec. 2, 2010.

(51) Int. Cl.
   *F16H 55/36*   (2006.01)

(52) U.S. Cl.
   USPC .......................................................... 474/94

(58) Field of Classification Search
   USPC ....................................... 474/171; 192/70.14
   See application file for complete search history.

(56) References Cited

U.S. PATENT DOCUMENTS

| | | | | |
|---|---|---|---|---|
| 2,398,261 A | * | 4/1946 | Stone | 192/45.017 |
| 4,795,402 A | * | 1/1989 | Reichardt | 464/74 |
| 5,474,499 A | * | 12/1995 | Olson | 464/83 |
| 5,545,089 A | * | 8/1996 | Kirschey | 464/83 |
| 5,788,576 A | * | 8/1998 | Varin | 464/83 |
| 5,899,811 A | * | 5/1999 | Kishibuchi et al. | 464/30 |
| 6,044,943 A | * | 4/2000 | Bytzek et al. | 192/41 R |

(Continued)

FOREIGN PATENT DOCUMENTS

| | | |
|---|---|---|
| DE | 202007018714 U1 | 11/2007 |
| JP | 2004-324738 A | 11/2004 |
| JP | 2008-095927 A | 4/2008 |

OTHER PUBLICATIONS

International Search Report and Written Opinion mailed Nov. 30, 2011 for PCT Application No. PCT/US2011/036466.

*Primary Examiner* — William A Rivera
*Assistant Examiner* — Michael Riegelman
(74) *Attorney, Agent, or Firm* — Alan Taboada; Moser Taboada

(57) ABSTRACT

Embodiments of the present invention provide improved overrunning pulleys that overcome one or more of the deficiencies in the prior art noted above. Embodiments of the present invention provide pulleys that are "springy" in the torque direction, yet have a lower effective spring constant (e.g., are less stiff) over a greater angular range. Further, in at least some embodiments, the inventive pulleys use a low cost and simple torque transfer geometry. Further, in at least some embodiments, the inventive pulleys afford significant overrun. Further, in at least some embodiments, the inventive pulleys are radially small in an overall envelope, in order to allow the alternator to reach its highest possible rotational speed, and thus output, during engine idle. Further, in at least some embodiments, the inventive pulleys are more durable, as they offer the aforementioned dynamics in both directions (torque and counter-torque).

12 Claims, 24 Drawing Sheets

(56) References Cited

U.S. PATENT DOCUMENTS

| | | | |
|---|---|---|---|
| 6,119,838 A * | 9/2000 | Igari et al. | 192/45.1 |
| 6,612,813 B2 * | 9/2003 | Kimura et al. | 417/319 |
| 6,802,779 B2 * | 10/2004 | Tabuchi et al. | 464/32 |
| 6,964,326 B2 * | 11/2005 | Kamping | 192/55.5 |
| 7,093,703 B2 * | 8/2006 | Ikeda et al. | 192/41 A |
| 7,357,195 B2 * | 4/2008 | Kamimura et al. | 173/216 |
| 7,712,592 B2 * | 5/2010 | Jansen et al. | 192/41 S |
| 7,967,121 B2 * | 6/2011 | Cali et al. | 192/42 |
| 7,985,150 B2 * | 7/2011 | Kamdem | 474/94 |
| 8,021,253 B2 * | 9/2011 | Dell et al. | 474/74 |
| 2002/0165053 A1 * | 11/2002 | Kimura et al. | 474/70 |
| 2004/0112700 A1 | 6/2004 | Liston et al. | |
| 2008/0312014 A1 | 12/2008 | Stief et al. | |
| 2009/0107791 A1 * | 4/2009 | Zhu et al. | 192/70.14 |
| 2010/0255943 A1 * | 10/2010 | Cali et al. | 474/94 |
| 2012/0172163 A1 | 7/2012 | Fitz | |

* cited by examiner

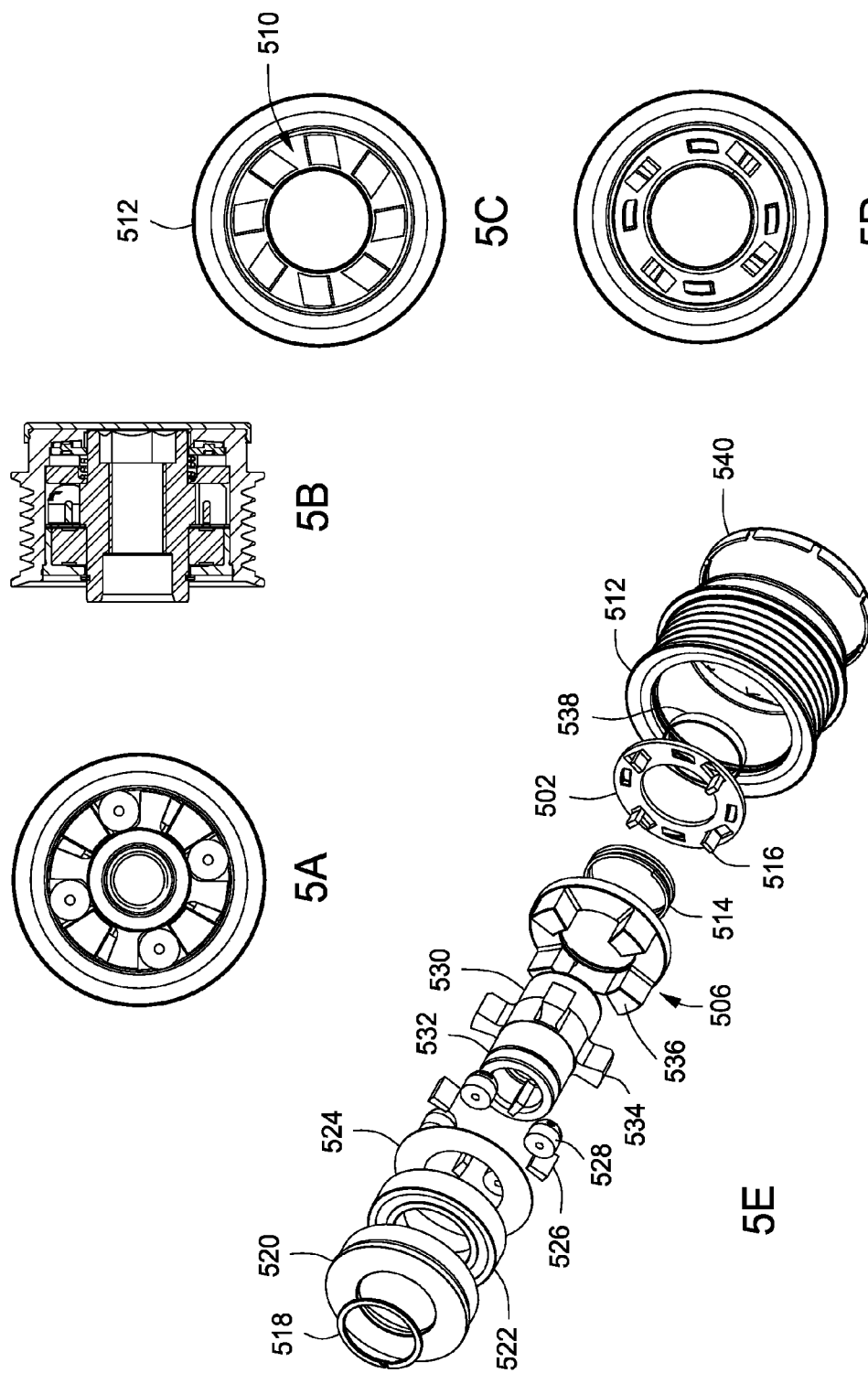

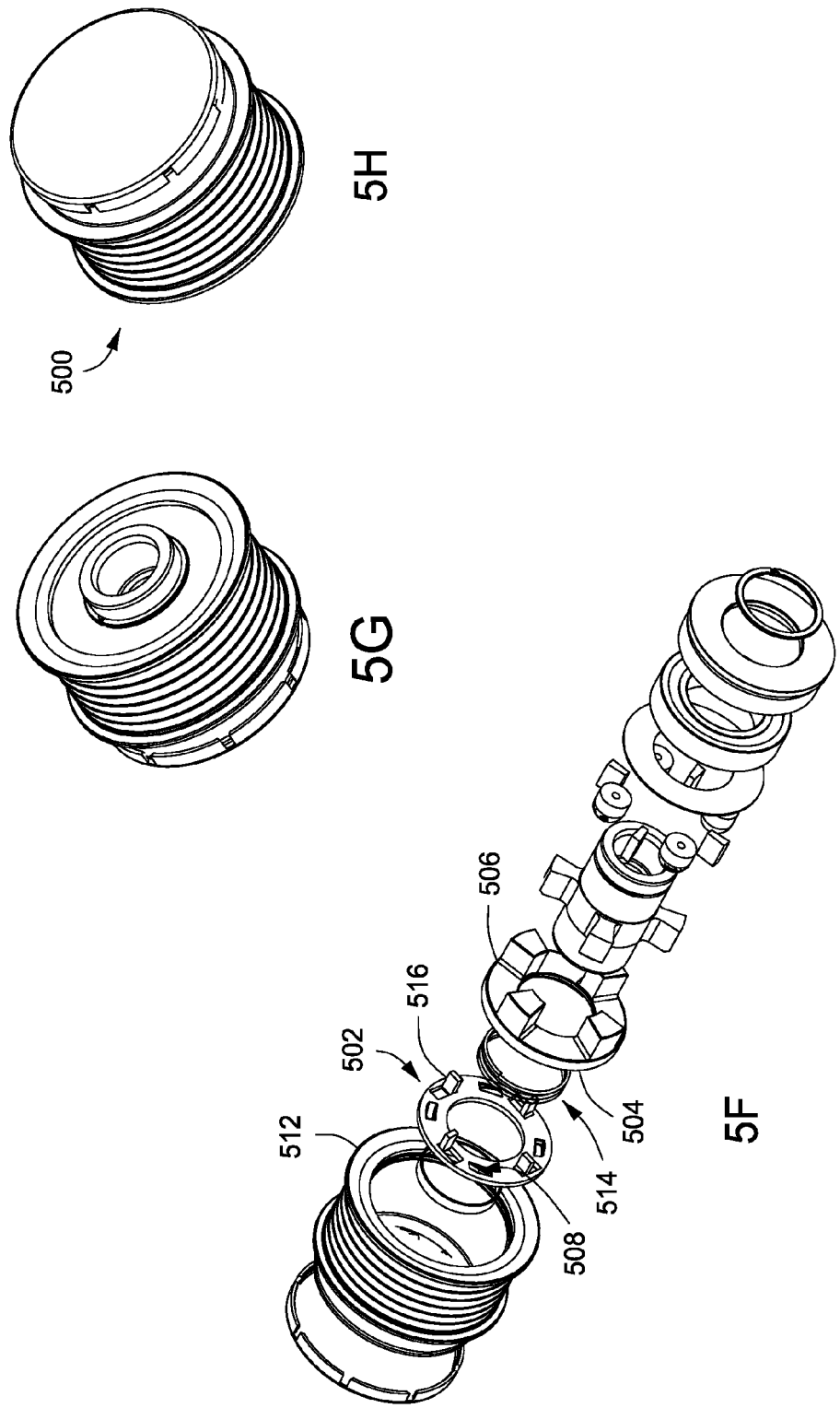

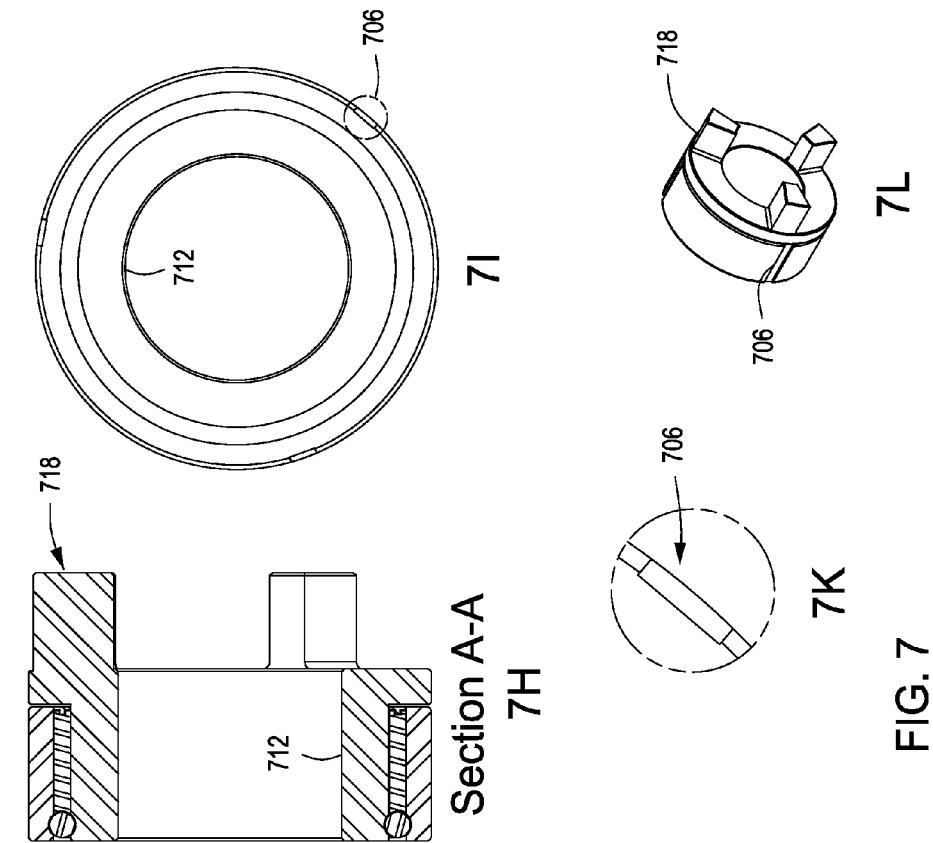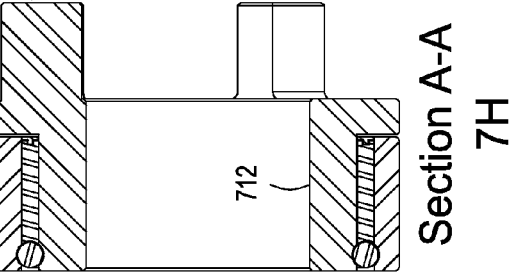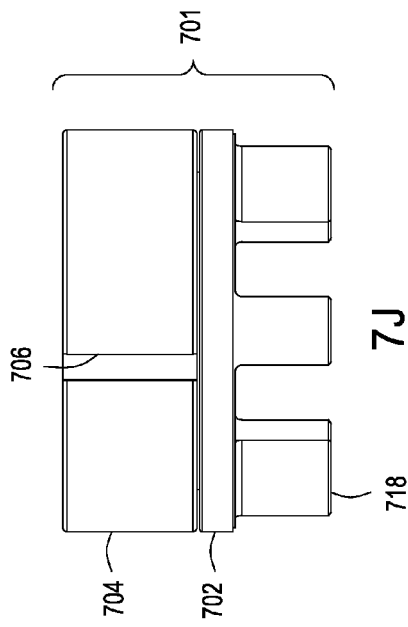
FIG. 7

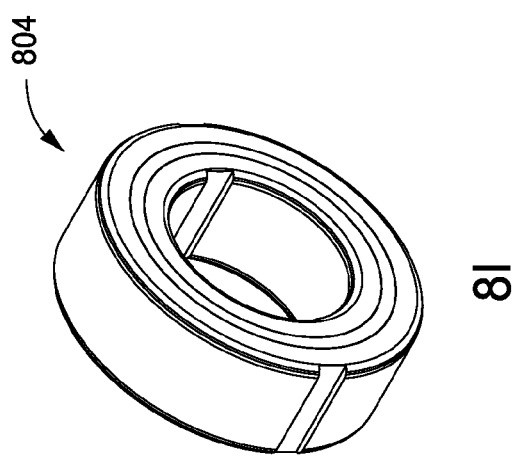
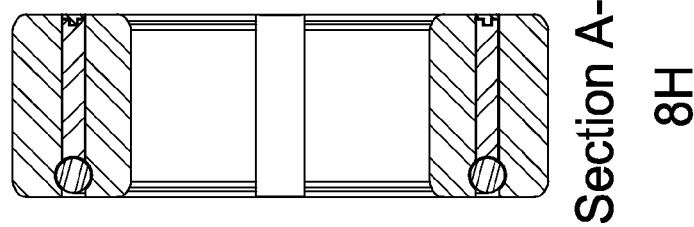
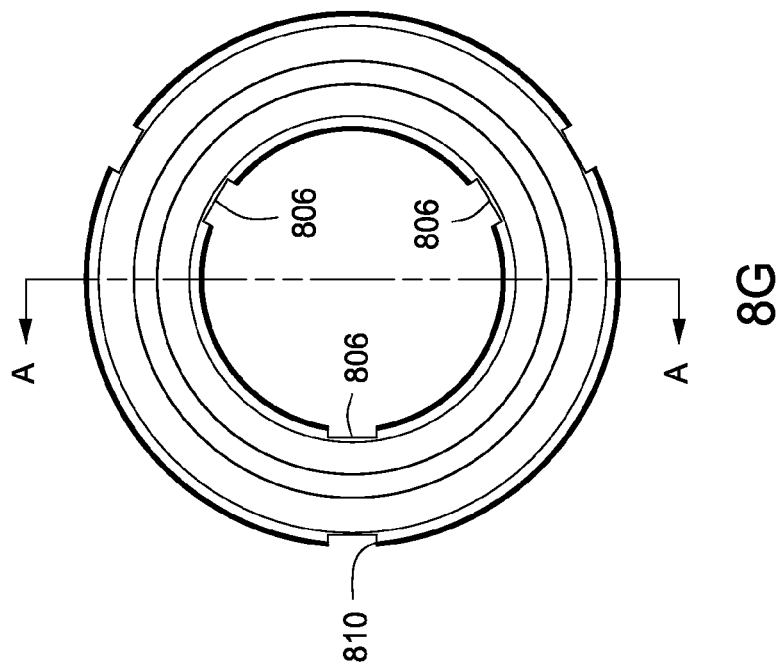
FIG. 8 (Cont)

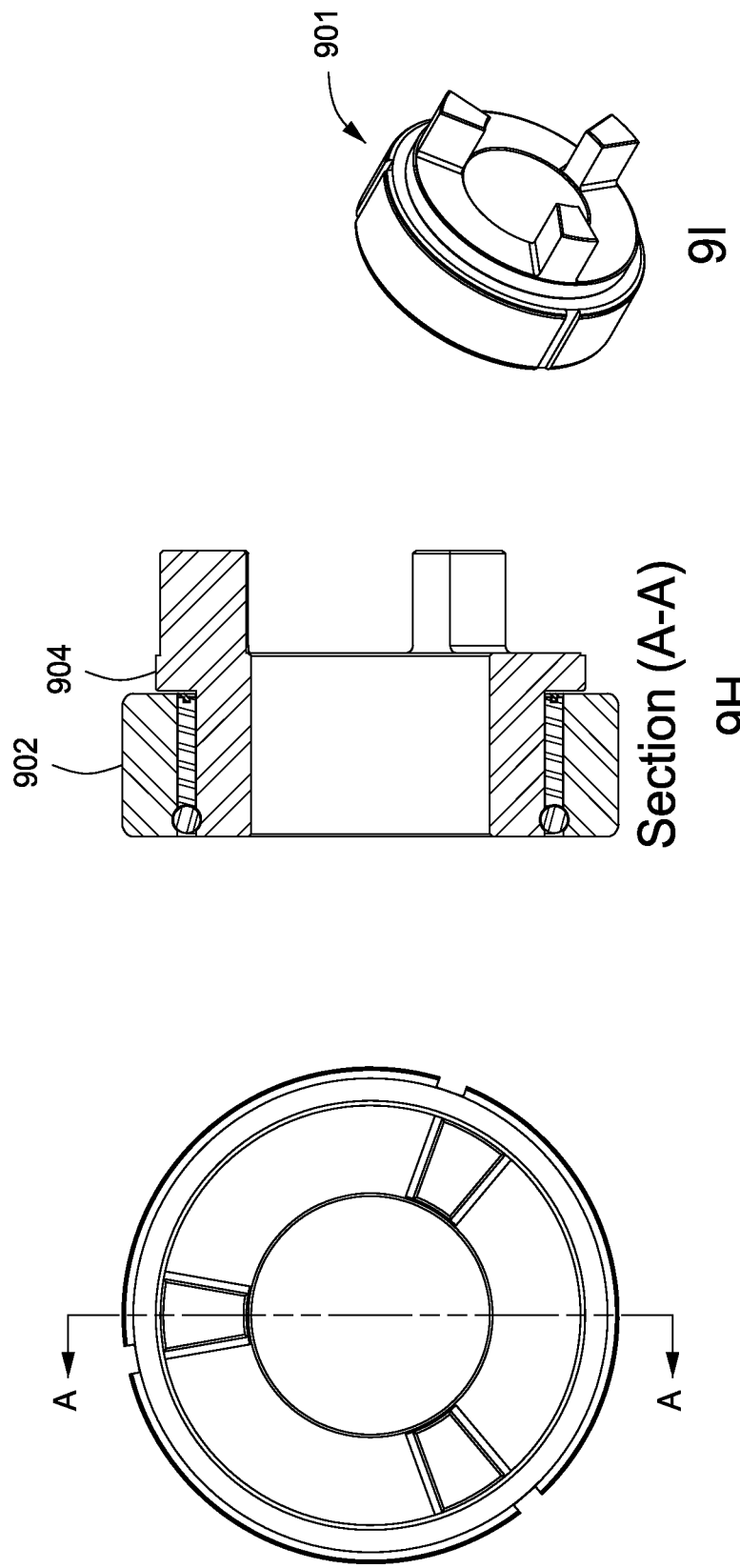

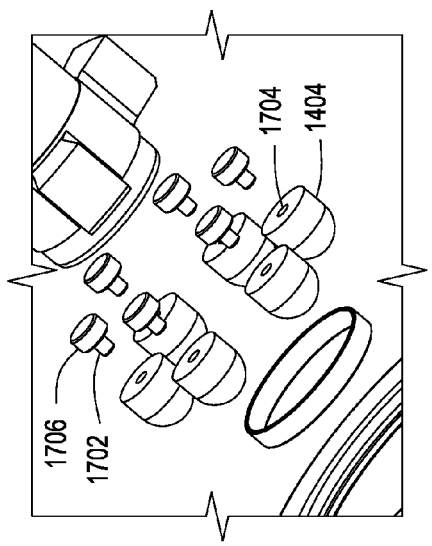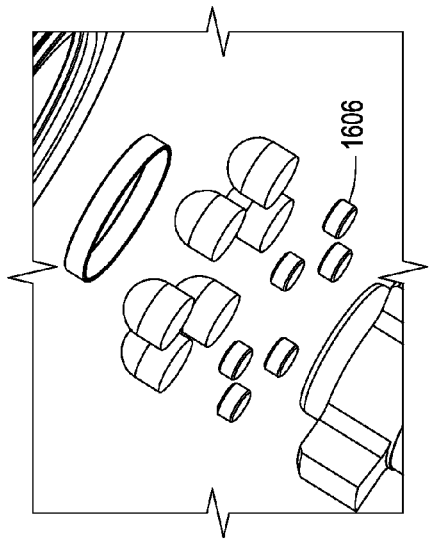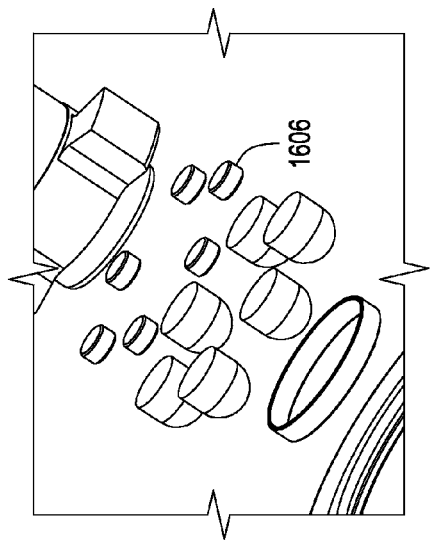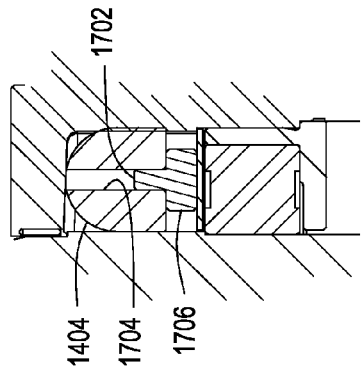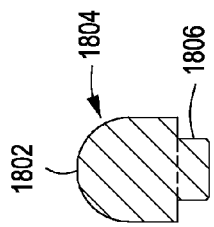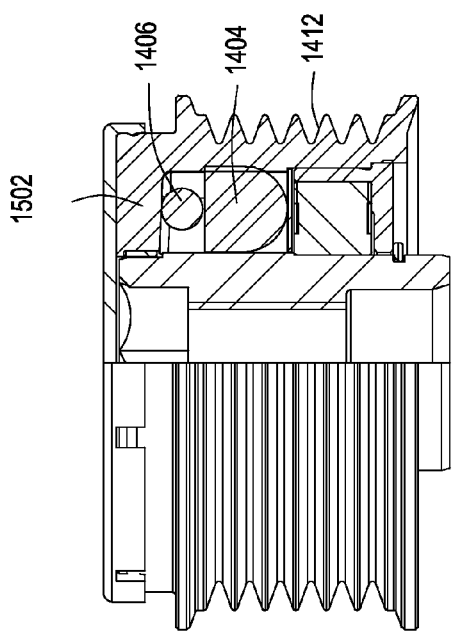

OVERRUNNING ISOLATING DECOUPLER PULLEYS

CROSS-REFERENCE TO RELATED APPLICATIONS

This application is a continuation of co-pending U.S. patent application Ser. No. 13/107,324, filed May 13, 2011, which claims benefit of U.S. provisional patent application Ser. No. 61/334,847, filed May 14, 2010, U.S. provisional patent application Ser. No. 61/366,374, filed Jul. 21, 2010, and U.S. provisional application Ser. No. 61/419,052, filed Dec. 2, 2010. Each of the aforementioned related patent applications is herein incorporated by reference.

FIELD

Embodiments of the present invention generally relate to torque load transfer, limitation, decoupling, and vibration dampening devices.

BACKGROUND

Torque transfer pulleys are used in many applications, such as to couple a remote device (such as an alternator or a supercharger) to a rotating system (such as an engine). The pulley may include a drive surface to be driven by the rotating system and may be coupled to a shaft that is coupled to the remote device. Several types of conventional torque transfer pulleys are depicted in FIG. 11. In each graph, the left side of the graph (negative angular displacement) corresponds to the relative rotation of a pulley with respect to a shaft coupled to the pulley in a direction counter to the direction of pulley rotation (for example, when the pulley is spinning slower than the drive shaft, or an overrun condition in embodiments where the pulley includes an overrunning clutch mechanism). This type of rotation is also referred to as rotation in a counter torque direction. The right side of each graph (positive angular displacement) corresponds to a relative rotation of the pulley in the same direction as the direction of pulley rotation (for example, when the pulley is spinning faster than the shaft). This type of rotation is also referred to as rotation in the torque direction.

In the upper left quadrant, a graph of the response of a solid pulley is shown. As seen by the line 1102, as the pulley is solid, there is zero angular displacement and 100 percent of the torque is transferred by the pulley to the shaft immediately, without any relative displacement between the pulley and the shaft. As the pulley does not overrun, it holds/brakes the drive belt 100 percent as per the solid vertical line below the origin. Such designs undesirably offer no decoupling of the rotor's rotational inertia from the pulsations of an internal combustion engine in the torque direction, and no overrun in the counter torque direction during sudden engine speed changes.

In the upper right quadrant, a graph of the response of a pulley having a free spin overrunning clutch is shown. As seen by the line 1104, the pulley transfers essentially 100 percent of the torque immediately, as per the solid vertical line above origin, upon rotation in the torque direction. The pulley also overruns immediately in the counter torque direction, so the belt is separated from the rotor inertia, as shown by the flat line at zero torque extending in the counter torque direction. Such pulley designs offer no springy engagement in the torque direction, and therefore are not frequency tunable to decouple the rotor's inertia from the engine's pulsations.

In the lower left quadrant, a graph of the response of a pulley having a free spin isolating decoupler is shown. As seen by the line 1106, the pulley transfers gradually increasing torque as per the upward sloping straight line extending in the torque direction. The pulley overruns immediately in the counter-torque direction, so the belt is separated from the rotor inertia. This pulley design offers springy engagement in the torque direction, therefore, is frequency tunable to decouple the rotor's inertia from the engine's pulsations. However, this pulley design typically employs a metallic torsional spring system that is not durable and is highly dependent on lubrication. Thus, lubrication retention is also necessary, which leads to additional complexities in the design and higher costs. Force vectors and the friction clutch overrun functions limit the choices of alternate materials for the body, such as thermoplastics and thermosets.

In the lower right quadrant, a graph of the response of an elastomeric spring pulley having a controlled overrun decoupler is shown. As seen by the line 1108, the pulley overruns up to a very limited range of angular travel, then quickly becomes asymptotic as springs within the pulley become completely engaged. Thus, this pulley design offers very limited overrun in the counter torque direction, then quickly behaves as a solid pulley. This pulley offers springy connection in the torque direction, but inventors have observed that the angular range is too limited, pushing the springs to operate near or at the asymptotic portion of the curve, causing the effective stiffness of the pulley to be too high in certain applications. The inventors have further observed that the high effective stiffness increases the pulley's natural frequency which can lead to resonance issues. The inventors believe that the limited angular range of motion of this pulley design forces the use of a spring system that is, from the onset, too stiff for some engine applications. Moreover, the inventors further believe that the overrun is too limited to properly manage sudden engine speed changes in certain engines sizes and types, particularly as alternators increase in output (i.e., present greater rotational inertia) given ever increasing vehicle electrical demands. The inventors believe that this highly constrained overrun may cause the belt to jump off the front end accessory drive (FEAD) path, as well as contribute to noise, vibration, and harshness (NVH). The lack of significant overrun also undermines benefits in fuel economy.

The inventors have observed that the limited range of the prior art can cause the spring material to fail under higher engine torque loads, such as under engine lugging conditions in manual transmission vehicles or in high amperage alternators or in diesel engines. In such circumstances, for example, the spring materials are so compressed that they can be pushed into minimal yet necessary radial voids between the interacting paddles, essentially pinching and shredding the springs. In another scenario of prior art, the limited range can push to springs into such deformation, beyond the material's limits, as to trigger hysteresis and/or catastrophic spring failure.

Thus, the inventors have provided improved overrunning pulley designs that address one or more of the above deficiencies in the prior art.

SUMMARY

Embodiments of the present invention provide improved overrunning pulleys that overcome one or more of the deficiencies in the prior art noted above. Embodiments of the present invention provide pulleys that are "springy" in the torque direction, yet have a low effective spring constant (e.g., are less stiff) over a greater angular range. Further, in at least some embodiments, the inventive pulleys use a low cost and simple torque transfer geometry. Further, in at least some embodiments, the inventive pulleys afford significant overrun. Further, in at least some embodiments, the inventive pulleys are radially small in an overall envelope, in order to allow the alternator to reach its highest possible rotational speed, and thus output, during engine idle. Further, in at least some embodiments, the inventive pulleys are more durable, as they offer the aforementioned dynamics in both directions (torque and counter-torque).

In some embodiments, an overrunning, isolating decoupler pulley may include a shaft; a pulley body disposed about the shaft, the pulley body and shaft rotatable with respect to each other in a first direction by at least a first angular displacement and in an opposing second direction by at least a second angular displacement; each of the pulley body and shaft having engagement features that engage upon sufficient rotation between the pulley body and the shaft, wherein the engagement features, when engaged, prevent further rotation between the pulley body and the shaft in a given direction; a movable element disposed between the engagement features of the pulley body and the shaft, wherein the movable element is movable with respect to each of the pulley body and the shaft and is movable at least within a range sufficient to provide either or both of the first angular displacement and the second angular displacement between the pulley body and the shaft; and a resilient member disposed between either or both of the movable element and the pulley body or the movable element and the shaft.

In some embodiments, the resilient member may be disposed between the movable element and the pulley body and another resilient member is disposed between the movable element and the shaft. In some embodiments, the resilient member may itself be modified to become a hard stop if shielded or its structure hybridized with metallic or manmade fiber meshes. In some embodiments, the amount of rotation between the pulley body and the shaft may be limited in one direction of rotation and not limited in the other direction of rotation. In some embodiments, the amount of rotation between the pulley body and the shaft may be limited in both directions of rotation. In some embodiments, the amount of rotation between the pulley body and the shaft may be limited in both directions of rotation, and the first angular displacement is sufficient for the application and may be greater than 20 degrees in one direction of rotation, or in some embodiments at least 90 degrees in one direction of rotation.

In some embodiments, an overrunning, isolating decoupler pulley may include a shaft; a pulley body disposed about the shaft, the pulley body and shaft rotatable with respect to each other in a first direction by at least a first angular displacement and in an opposing second direction by at least a second angular displacement; each of the pulley body and shaft having engagement features that engage upon sufficient rotation between the pulley body and the shaft, wherein the engagement features, when engaged, prevent further rotation between the pulley body and the shaft in a given direction; a resilient member disposed between the pulley body and the shaft, wherein the resilient member is compressed between the pulley body and the shaft upon sufficient rotation between the pulley body and the shaft; and one or more features disposed between the pulley body and the shaft that prevent compression of the resilient member beyond a desired amount.

In some embodiments, an overrunning, isolating decoupler pulley may include a shaft having one or more radially outwardly extending paddles; a pulley body disposed about the shaft and having one or more radially inwardly extending paddles, the pulley body and shaft rotatable with respect to each other in a first direction by at least a first angular displacement and in an opposing second direction by at least a second angular displacement; wherein the one or more radially outwardly extending paddles and the one or more radially inwardly extending paddles engage upon sufficient rotation between the pulley body and the shaft, and, when engaged, transfer torque between the pulley body and the shaft; a resilient member disposed between the pulley body and the shaft and between pairs of the one or more radially outwardly extending paddles and one or more radially inwardly extending paddles, wherein the resilient member is compressed between the paddles of the pulley body and the shaft upon sufficient rotation between the pulley body and the shaft; and a hard stop comprising one or more features disposed between the pulley body and the shaft that prevents compression of the resilient member beyond a desired amount.

Thus, the inventive pulleys disclosed herein may provide increased engagement travel without paying any price in the overrun side. In some embodiments, the inventive pulleys may provide increased engagement travel and increased overrun range of motion. In some embodiments, the inventive pulleys may provide increased durability under high torque conditions.

Other embodiments and variations of the invention are described below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5 depicts various views (labeled 5A-5H) of an overrunning pulley in accordance with some embodiments of the present invention.

FIG. 15 depicts a side view in partial cross section of an overrunning pulley in accordance with some embodiments of the present invention.

FIGS. 16A-B depict various views of a portion of an overrunning pulley in accordance with some embodiments of the present invention.

FIGS. 17A-B depict various views of a portion of an overrunning pulley in accordance with some embodiments of the present invention.

FIG. 18 depicts a resilient member of an overrunning pulley in accordance with some embodiments of the present invention.

The drawings depicted herein are simplified for ease of understanding and may not be drawn to scale. Similar reference numerals used between the drawings indicate identical or similar components.

DETAILED DESCRIPTION

Figure 1:
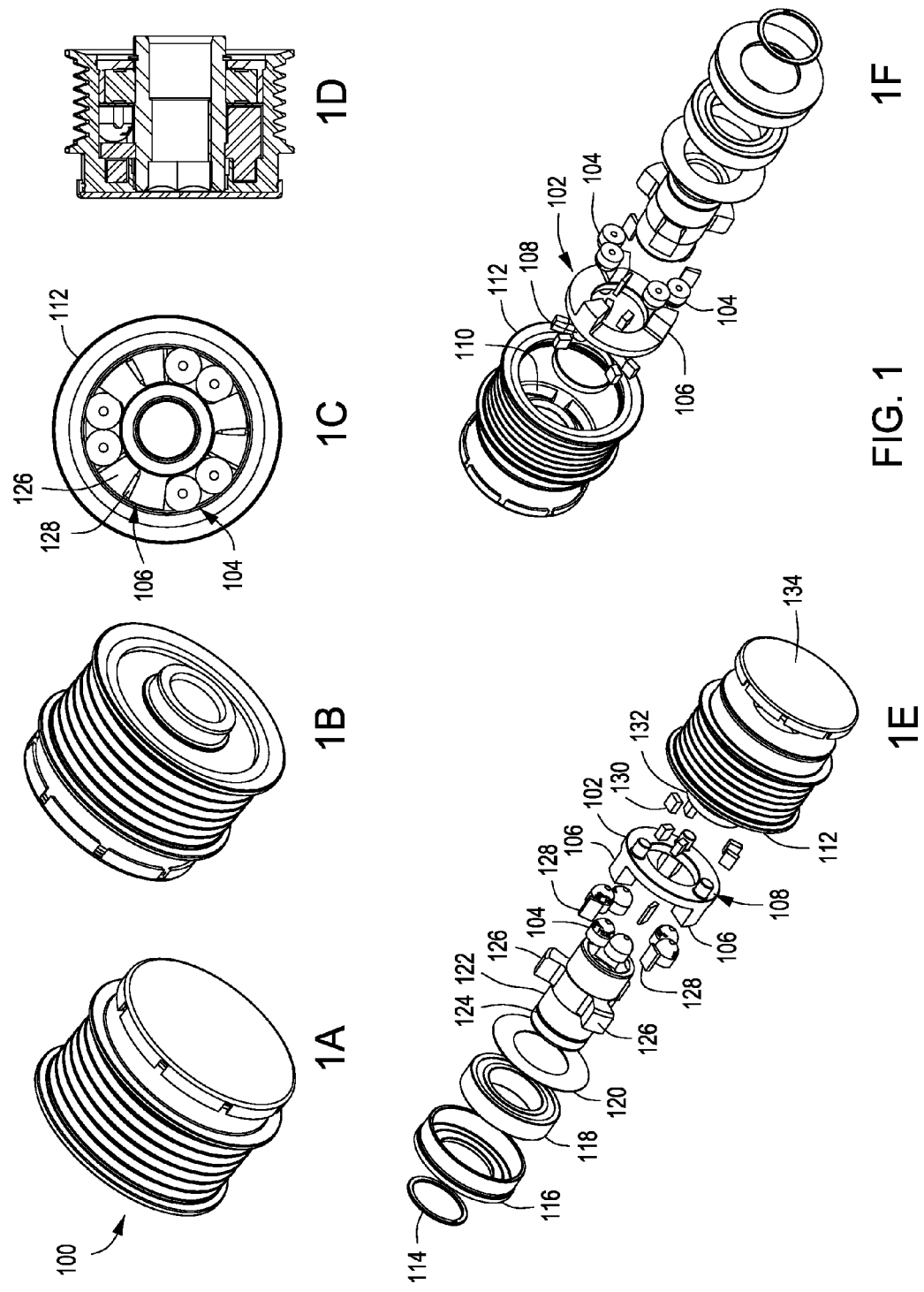
FIG. 1 depicts various views (labeled 1A-1F) of an overrunning pulley in accordance with some embodiments of the present invention.

Embodiments of the present invention provide improved overrunning pulleys that overcome one or more of the deficiencies in the prior art noted above. Such pulley designs may be used in such non-limiting applications as industrial conveyor systems, superchargers, starting and/or charging (alternators & hybrid) systems in engines and motors, or the like that exhibit significant rotational inertia.

Embodiments of the present invention provide pulleys that are "springy" in the torque direction, yet have a low effective spring constant (e.g., are less stiff) over a greater angular range. As used herein, the torque direction relates to the direction of relative motion or transfer of torque where the pulley is rotating faster than the shaft, or where the pulley is pushing on the shaft, for example, to drive a component coupled to the pulley, such as a rotor in an alternator application to charge the alternator. The counter-torque direction is the opposite direction. For example, where the pulley is rotating slower than the shaft (e.g., the shaft is rotating in a direction counter to the direction of pulley rotation). Further, in at least some embodiments, the inventive pulleys use a low cost and simple torque transfer geometry. Further, in at least some embodiments, the inventive pulleys afford significant overrun. Further, in at least some embodiments, the inventive pulleys are radially small in an overall envelope, in order to allow the alternator to reach its highest possible rotational speed, and thus output, during engine idle. Further, in at least some embodiments, the inventive pulleys are more durable, as they offer the aforementioned dynamics in both directions (torque and counter-torque) and may include hard stop features Embodiments of the inventive pulleys may use moveable and individually rotating engagement features or projections, such as paddles. While the moveable paddles could be those located/interfacing either with the body or the shaft of the pulley, as described below, the attached embodiments illustrate the body's paddles as rotating. One reason is to simplify the geometry of the body, a significant cost component in terms of manufacturing and weight.

By enabling the engagement features, or paddles, to rotate in one direction and transfer torque in the other, significantly greater space is made available for the torque-side springs to allow for the decrease of the spring constant (less stiff) and operation at this lower effective spring constant over a greater angular range. Thus, the present inventive pulleys offer a sufficiently weak—as opposed to stiff—spring system, thereby lowering the effective spring constant of the system. Thus, the natural frequency of the inventive pulleys may be advantageously tuned to be sufficiently below the engine's lowest excitation frequency, thereby avoiding system resonance problems.

All the while, this novel approach may permit the overrun span to increase significantly, rather than reducing the available overrun span. In some embodiments, the overrun span may be increased to be sufficient, including but not limited to a finite value of greater than about 20 degrees, or in some embodiments, a finite value of greater than about 90 degrees. Thus, the embodiments of the present inventive pulleys may advantageously eliminate the impossible to resolve give-and-take of the prior art, where increasing the angular range in the torque direction would result in further limiting an already too limiting counter-torque angular range/span. The embodiments of the present inventive pulleys may further advantageously address the no-win counter effect in the prior art, as an increase in the overrun span in the prior art would normally come at a cost of angular range and stiffness in the torque direction.

The inventive pulleys advantageously provide an increased range of angular displacement in the driving (torque) direction and in the overrun (counter torque) direction as compared to conventional pulleys, which often have, at the most, a maximum of less than about 20 degrees. The increased angular rotational range in the torque direction advantageously exposes the springs to lower stress and fewer exposure events to full compression, possibly beyond the spring material's mechanical limits. In addition, by affording more space for the torque springs, the present designs permit more spring material to be used, thus affording more material to manage the stresses. Further, by working less frequently in a fully stressed condition, the durability of the springs is extended. In addition, the significantly greater free spin overrun enabled by the novel design handily manages sudden engine speed changes, helps maintain the belt on the FEAD path, and affords fuel economy benefits not present in prior art. Also, the increased range of angular displacement and associated lower effective pulley spring constant advantageously facilitates better attenuation of the frequencies of the engine's pulsations, particularly those of larger torque engines (diesel) as well as smaller, torsionally active gas engines. In addition, the greater free spin overrun range enabled by embodiments of the present invention may also eliminate the need for any resilient members on the no-load/overrun (e.g., counter-torque) direction, which further advantageously reduces the number of components of the pulley.

Further, the increased overrun span, as well as the increased range of angular displacement on the torque transfer side, enables the rolling elements in the two-way ball bearings to increase their range of motion, instead of cycling within a very limited range. This limited range cycling is detrimental to bearings, as it highly localizes the operation of the rolling elements, displacing and cavitating the grease necessary for their durability.

The details and variations disclosed with respect to certain components in any of the following embodiments are applicable to any similar components of any other of the embodiments, except to the extent inconsistent with the description of a particular embodiment.

All embodiments described below can include bodies that are steel, sintered metal, metal injection molded (MIM), molded out of thermoplastics or thermosets, or are extruded or cast from a metal, such as aluminum or iron. The interface of parts to these bodies can be press fit, keyed, slotted, overmolded, glued, threaded, crimped, ring-locked, or other suitable methods. The springs in any of the embodiments below may be resilient members of any elastic or viscoelastic nature, as well as metallic or made of man-made fiber, or any combination thereof. Further, the springs in any of the embodiments below may function as hard stops via being shielded or hybridized with metallic and/or manmade fibers and/or meshes (as described in more detail below). In addition, in all embodiments, any two-way and one-way bearings in each embodiment can be shielded or sealed, thus allowing them to be self-lubricating and sealed as a stand-alone component, rather than having to introduce additional seals into the assembly. However, the possibility of open bearings is also an option in these designs, requiring only the sealing of lubricants at another location in the assembly.

FIG. 1 depicts various views (FIGS. 1A-1F, collectively referred to as FIG. 1) of an overrunning pulley in accordance with some embodiments of the present invention. Specifically, FIGS. 1A-B are perspective views of a pulley 100 from opposing sides of the pulley 100. FIG. 1C is a cross-sectional view perpendicular to the axis of rotation of the pulley 100. FIG. 1D is a cross-sectional view along the axis of rotation of the pulley 100. FIGS. 1E-F are exploded perspective views of the pulley 100 from opposing sides of the pulley 100.

The pulley 100 depicted in FIG. 1 embodies a grooved body, partial overrun design. The pulley 100 includes a unique moveable pocket plate 102, accommodating the larger angular range for the springy connection via resilient members 104 on the driving (torque) side. The range of motion in the torque direction may be as large as possible. For example, in some embodiments, the range of motion in the torque direction may exceed at least 15 degrees. The larger the range of motion, the greater the opportunity for the spring system to manage the energy from the engine pulsations. If the range is too short, the spring system must be very stiff, which undesirably translates to a high spring constant and a high natural frequency, which undesirably increases the likelihood of resonance due to the matching or near matching of the engine excitation frequencies with the natural frequency of the pulley. The overrun side is triggered when the overrun stops 106 of the moveable pocket plate 102 are engaged, causing the guides 108 under the moveable pocket plate 102 to rotate freely in the counter-torque direction. The guides 108 ride in grooves 110 located in an inner wall of the pulley body 112, allowing for a finite, but larger than 90 degrees overrun span.

As depicted in the exploded view of FIG. 1E, the pulley body 112 is hollow, having a tubular body with an outer drive surface for interfacing with a driven element, for example via a v-groove belt (although other suitable driving mechanisms may be used). The pulley body includes an inwardly extending flange on one side of the body, having the grooves 110 disposed in the flange. The grooves can also be machined into the internal vertical face of the pulley body, and/or molded as part of the pulley body.

As can be seen in FIGS. 1A-B and 1D, the assembly generally fits compactly within the hollow pulley body 112. The moveable pocket plate 102 fits within the hollow pulley body and the guides 108 fit within the grooves 110 of the pulley body 112. A set of resilient members 130 are disposed on either side of the guides 108, within the grooves 110. The resilient members 130 could be of multiple geometries, depending on any preferred or necessary fixturing to the grooves. For example, the resilient members 130 could be glued to the end groove wall, or could be belt-like to embrace features between the grooves or could have projections that would match or possibly mate or possibly penetrate into the groove walls. These resilient members 130 not only address possible end-of-travel impact noise during severe overrun events, but also offer resiliency to gradually bridge the end of travel freespin to full stop transition.

On the other side of the moveable pocket plate 102, a plurality of overrun stops 106 (three shown, evenly spaced apart), are provided. The overrun stops 106 interface with engagement features (e.g., paddles 126) of a shaft 122 in a torque transfer direction of rotation via one or more resilient members 104. The overrun stops 106 also interface with the paddles 126 in a counter torque direction of rotation (e.g., overrun) via resilient members 128. The shaft 122 may be coupled to a remote device to be driven by rotation of the pulley body 112. For example, the shaft 122 may be hollow and may be keyed, splined, threaded, glued, or the like, to a shaft of the remote device, for example a rotor shaft of an alternator.

A flat washer 120 is disposed over the shaft 122 to contain the resilient members 104, 128 and to separate resilient member 104, 128 from the bearing 118. A two-way bearing 118 interfaces with the shaft 122 along an inner race of the bearing 118 and with a housing 116 along an outer race of the bearing 118. The housing 116 fits within the pulley body 112 and is press fit or otherwise rotationally coupled thereto. A lock ring 114 fits within a groove 124 of the shaft 122 to lock the assembly together and to restrict any relative axial displacement during operation between the components. A cap 134 is disposed on the other side of the pulley body 112 to seal and protect the assembly.

Figure 2:
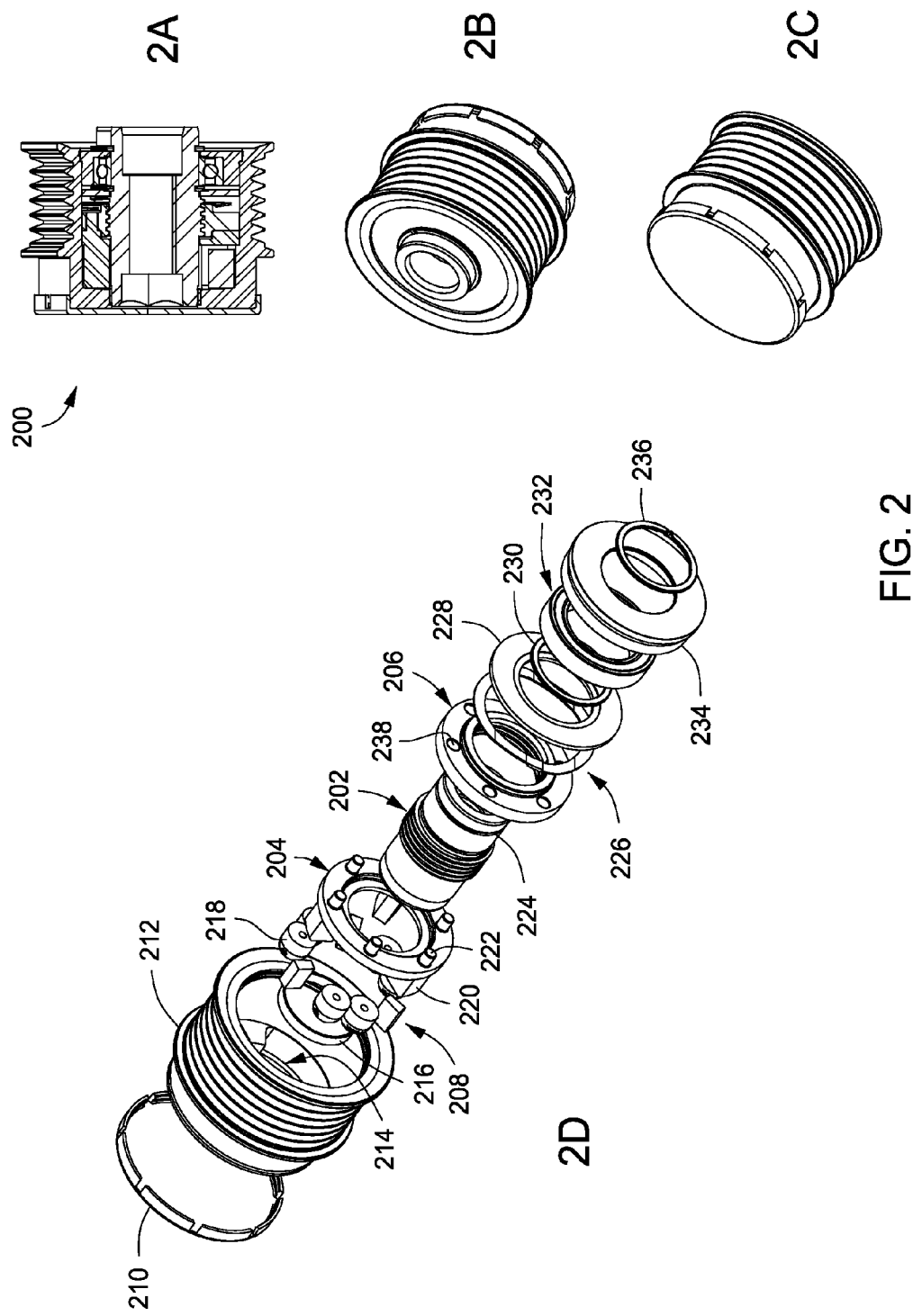
FIG. 2 depicts various views (labeled 2A-2D) of an overrunning pulley in accordance with some embodiments of the present invention.

FIG. 2 (FIGS. 2A-2E, collectively referred to as FIG. 2) depicts a pulley 200 having a threaded shaft, partial overrun design. The pulley 200 includes a threaded shaft 202, combined with a partially threaded floating pocket plate 204 and threaded guide washer 206 create a unique and novel overrun geometry. During overrun events, the overrun stops 208 are engaged, thereby rotating the partially threaded floating/moveable pocket plate 204. The partial thread limits the total number of threaded turns the threaded floating pocket plate 204 can "walk" or move, before stopping, thus allowing the pulley to overrun either partially or up to one or more full 360 degree revolutions in overrun before it stops. The significant partial overrun provided by the pulley 200 (and other similar embodiments described herein) advantageously limits wild and high rpm pulley conditions.

The pulley 200 also includes, as shown from left to right in FIG. 2D, a cap 210; a pulley body 212 having grooves/openings 214 formed on an inner surface of a flange of the pulley body 212; a bushing or bearing 216; resilient members 218; the partially threaded floating pocket plate 204 having overrun stop engaging features 220 extending from one side and pins or locating features 222 disposed on an opposing side, as well as having a partial thread possibly leading to a hard stop (e.g., axial travel limiting) feature; the shaft 202 including a groove 224 for a lock washer 236; the threaded guide washer 206 having a plurality of openings 238 configured to mate with the pins or locating features 222 of the partially threaded floating pocket plate 204 to rotationally couple the threaded guide washer 206 and the partially threaded floating pocket plate 204; a spring washer 226, a flat washer 228, a bushing 230, a two-way ball bearing 232, and an optional housing 234.

Figure 3:
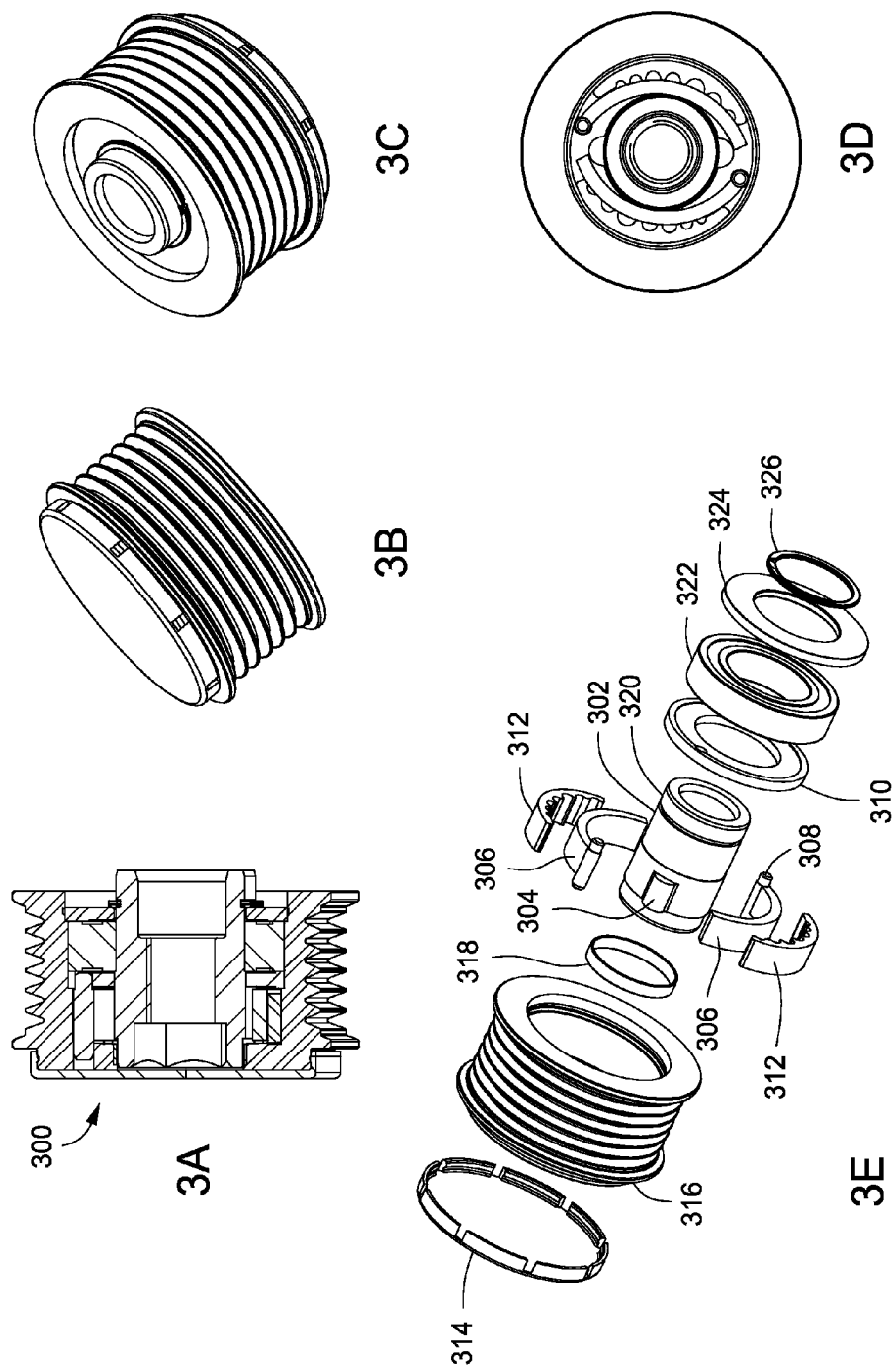
FIG. 3 depicts various views (labeled 3A-3E) of an overrunning pulley in accordance with some embodiments of the present invention.

FIG. 3 (FIGS. 3A-3E, collectively referred to as FIG. 3) depicts a pulley 300 having an elliptical, partial overrun design. The pulley 300 includes a shaft 302 having a pair of radially extending engagement features, or bumps (referred to herein as paddles 304). The paddles 304 rotate and press against corresponding pivoting shields 306. The shields 306 pivot (for example about a post 308 interfacing with a corresponding hole in a guide washer 310) and "give" against their springy backstops/cushions (resilient members 312), offering a springy engagement effect. As the shaft 302 rotates in a torque transfer direction, the paddles 304 press against the shields 306, which pivot and compress the resilient members 312. Upon reaching a certain angular travel, the shaft's paddles 304 are radially limited by the shields 306, thereby limiting pivot travel. In other words, further rotation of the shaft 302 relative to the pulley body 316 is prevented due to end of the pivot travel of the shields 306 being reached. The overrun event reverses this described dynamic.

The pulley 300 also includes, as shown from left to right in FIG. 3E, a cap 314; a pulley body 316 having a flange disposed on one side to support one side of the shields 306; a bushing 318; the shaft 302 including a groove 320 for a lock washer 326; a two-way bearing 322; and a flat washer 324.

Figure 4:
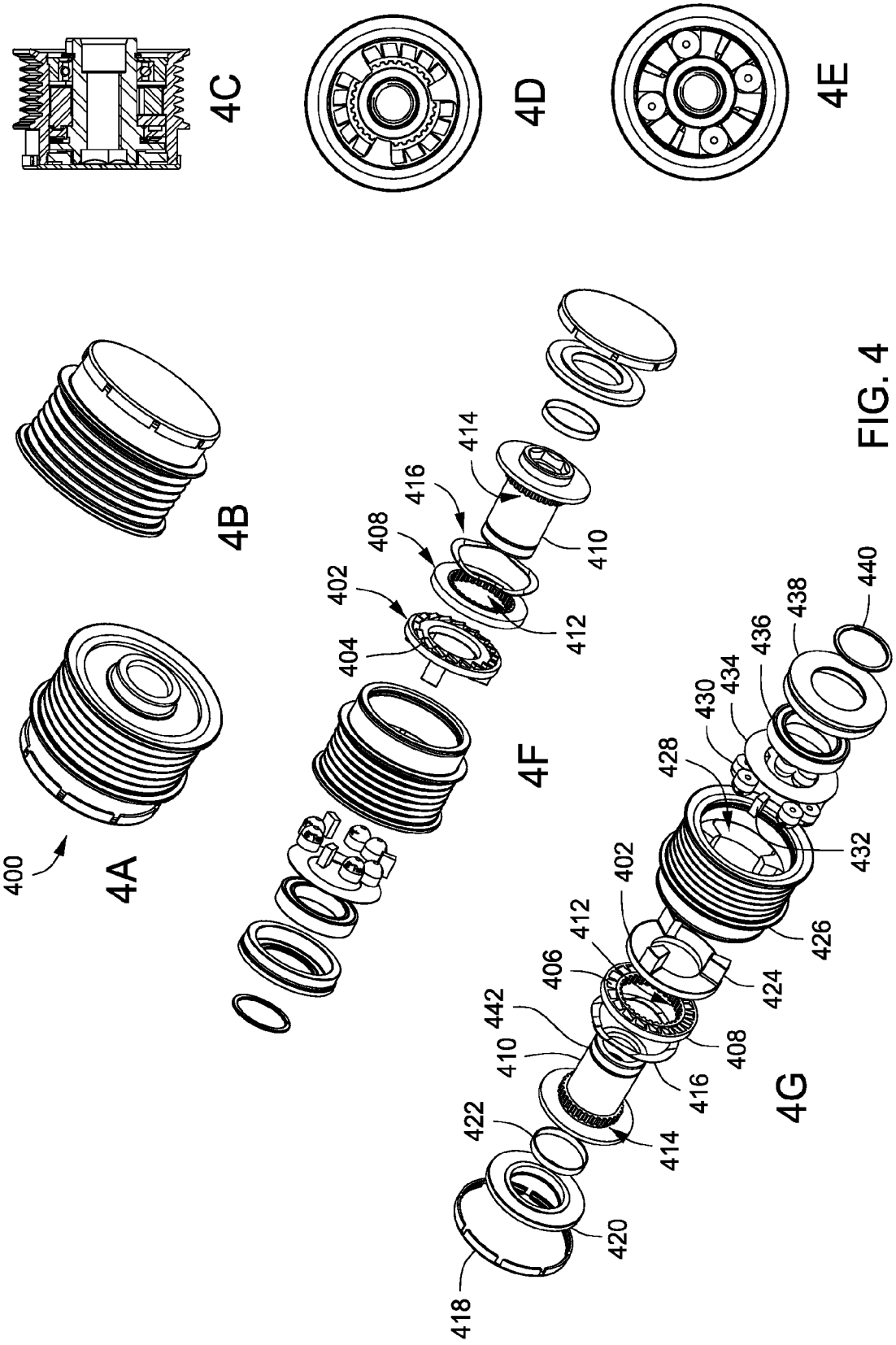
FIG. 4 depicts various views (labeled 4A-4G) of an overrunning pulley in accordance with some embodiments of the present invention.

FIG. 4 (FIGS. 4A-4G, collectively referred to as FIG. 4) depicts a pulley 400 having a complete overrun design using a set of ratchets and ramps. The pulley 400 includes a moveable pocket plate 402 that is ratcheted, whereas the ratchets 404 interface with corresponding ramps 406 on a notch plate 408. During torque/driving events, the ratchets 404 and ramps 406 are positively engaged, transmitting torque to a shaft 410 via splines 412 (straight or helical) found at the ID of the notch plate and corresponding splines 414 at the OD of the shaft 410. A compression spring 416 assists in the return of the notch plate 408 into mesh with the pocket plate 402 once the overrun event is complete.

The pulley 400 also includes, as shown from left to right in FIG. 4G, a cap 418; a washer 420; a bushing 422; the shaft 410 having a groove 442 to fit a lock washer 440; the compression ring 416 and notch plate 408; the moveable pocket plate 402 having a plurality of overrun stops 424; a pulley body 426 having a plurality of radially inwardly extending features 428 to interface with the overrun stops 424 via a pair of resilient members 430 in the torque direction and via a resilient member 432 in the counter torque direction; a flat washer 434; a two-way bearing 436; an optional housing 438; and the lock washer 440.

FIG. 5 (FIGS. 5A-5H, collectively referred to as FIG. 5) depicts a pulley 500 having a complete overrun design using a stamped (or molded, cast, or fine blanked) pocket plate with raised stop tabs. The pulley 500 includes a stamped pocket plate 502 that is rotationally driven by a movable pocket plate 506. Guide slots 504 disposed in a bottom surface of the moveable pocket plate 506 interface with features 514 of the stamped pocket plate 502. The features 514 may be stamped into the stamped pocket plate 502. The stop tabs 508 of the stamped pocket plate 502 are meshed/locked against mating ramps/notches 510 found on the inside face of a pulley body 512. Thus, during torque/driving events, the tabs 508 drive the body 512 via the engagement with the body's notches/ramps 510. As the pulley 500 goes into overrun, the stamped pocket plate tabs 508 slide over the notches 510 and recede axially towards the moveable pocket plate 506. A compression spring 514 assists in the return of the stamped notch plate 502 into mesh with the movable pocket plate 506 once the overrun event is complete.

The pulley 500 also includes, as shown from left to right in FIG. 5E, a lock washer 518; a housing 520; a two-way bearing 522; a flat washer 524; a first plurality of resilient members 528 disposed between engagement features (e.g., paddles 534) of a shaft 530 and overrun stops 536 of the moveable pocket plate 506 in a torque transfer direction; a second plurality of plurality of resilient members 526 disposed between the paddles 534 and the overrun stops 536 in a counter torque transfer direction; the shaft 530 having a groove 532 to interface with the lock washer 518; the moveable pocket plate 506; the compression spring 514; the stamped pocket plate 502; a bearing 538; the pulley body 512; and a cap 540.

Figure 6:
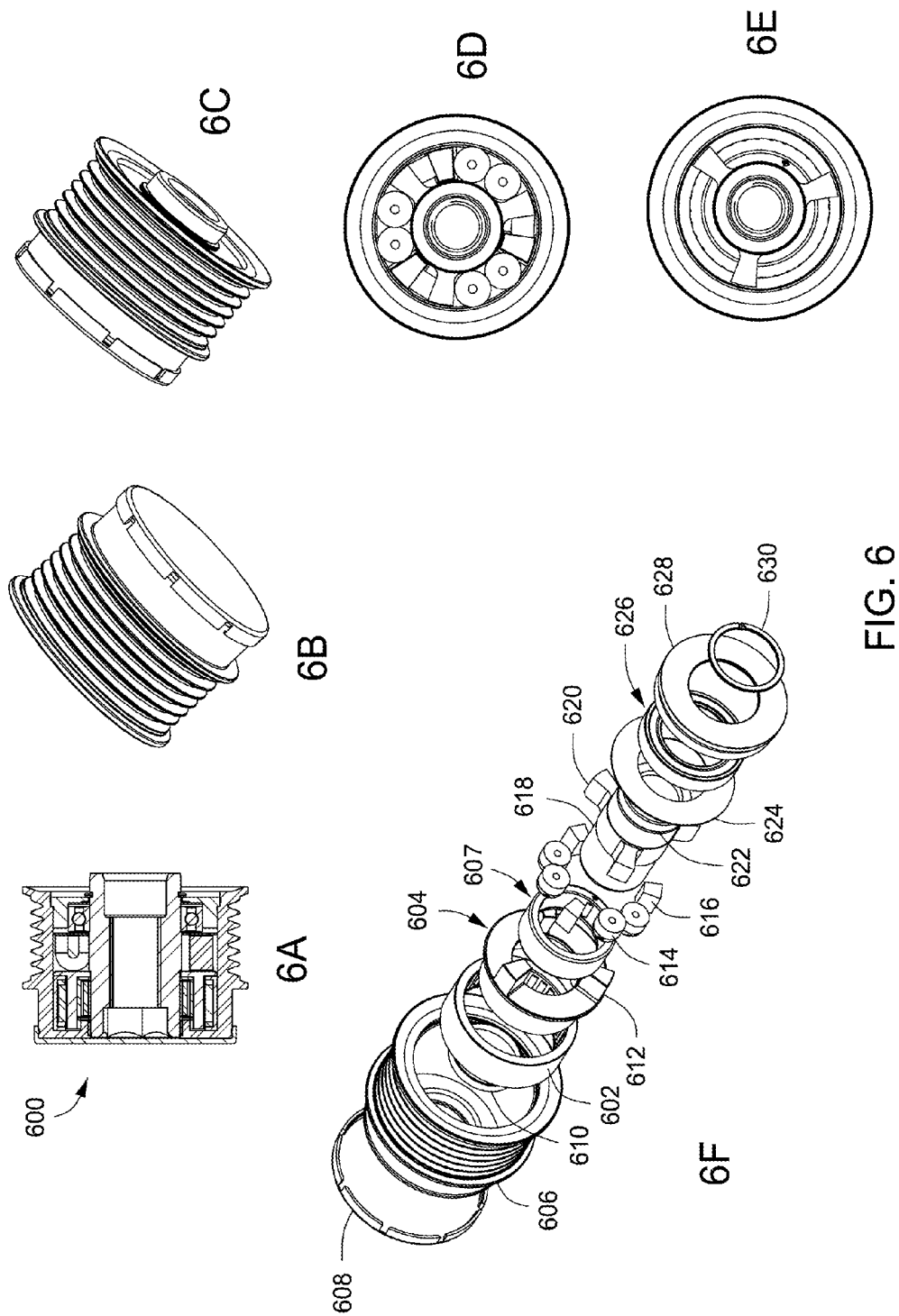
FIG. 6 depicts various views (labeled 6A-6F) of an overrunning pulley in accordance with some embodiments of the present invention.

FIG. 6 (FIGS. 6A-6F, collectively referred to as FIG. 6) depicts a pulley 600 having a complete overrun design. The pulley 600 includes a one-way bearing 602 disposed around a moveable/floating pocket plate 604. During torque/driving events, the floating pocket plate 604 rotates relative to the one-way bearing 602, causing the bearing's one-way function to lock. Inasmuch as the one-way bearing is press fit (or could be grooved/keyed, glued, or molded) into a pulley body 606, the system transfers torque from the belt (not shown). In the overrun direction, the one-way bearing 602 rotates in its natural free spin direction relative to the floating/moveable pocket plate 604. Inside the pocket plate 604 is a standard two-way bearing 607 to ensure proper journaling, although other sliding members can be used as well.

The pulley 600 also includes, as shown from left to right in FIG. 6F, a cap 608; the pulley body 606; a bushing 610; the one-way clutch bearing 602; the floating/moveable pocket plate 604 having a plurality of overrun stops 612; the two-way bearing 607; resilient members 614; resilient members 616; a shaft 618 having a groove 622 to fit a lock washer 630, and further having a plurality of radially outwardly extending engagement features 620 (or paddles) to interface with the overrun stops 612 via the resilient members 614 in the torque direction and via the resilient members 616 in the counter torque direction; a flat washer 624; a two-way bearing 626; an optional housing 628; and the lock washer 630.

Figure 7:
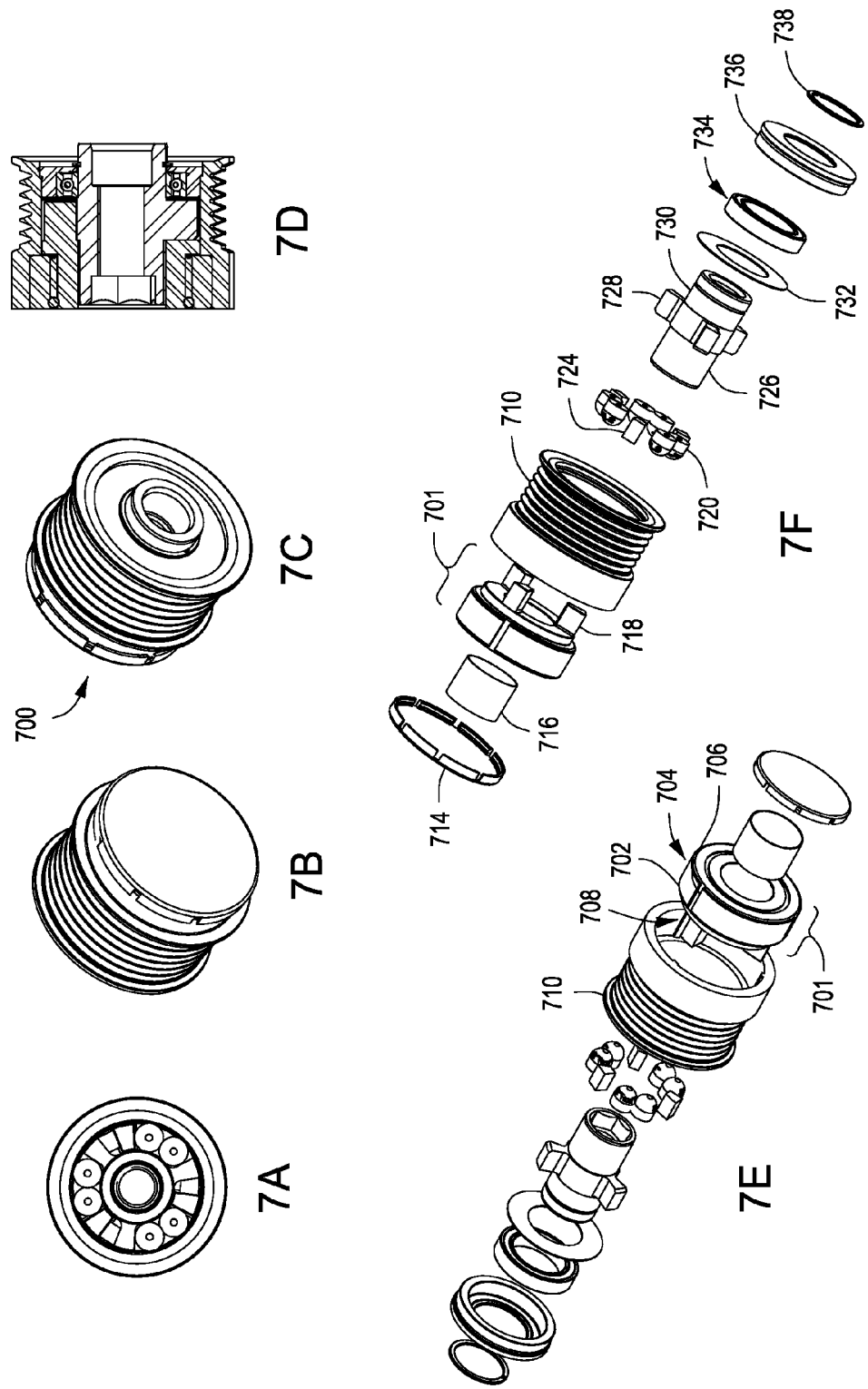
FIG. 7 depicts various views (labeled 7A-7L) of an overrunning pulley in accordance with some embodiments of the present invention.

FIG. 7 (FIGS. 7A-7L, collectively referred to as FIG. 7) depicts a pulley 700 having a complete (e.g., free-spin) overrun design. The pulley 700 uses a floating pocket plate 702 coupled to a one-way clutch bearing 704. The one-way function of the bearing 704 can be accomplished via roller clutch, or sprags, or other similarly functioning designs.

As show in FIGS. 7G-L, the floating/moveable pocket plate 702 may be coupled to the inner race of the one-way clutch bearing 704 to form a one-way floating pocket plate 701. In some embodiments, the floating/moveable pocket plate 702 may be an integral part of an inner race 712 of the one-way clutch bearing 704 (e.g., the inner race 712 and the pocket plate 702 are fabricated from a single piece of material). The bearing/pocket plate assembly (e.g., the one-way floating pocket plate 701) illustrated in FIG. 7 locks when rotating in the locking direction of the one-way clutch bearing 704 and overruns when rotating in the other direction.

The one-way floating pocket plate 701 is rotationally coupled to a pulley body 710. For example, the outer surface of the one-way floating pocket plate 701 can be slotted into the pulley body 710, or can be pressed fit, adhesive glued, or overmolded into the pulley body 710. For example, as shown in FIG. 7E, a plurality of slots 706 may be formed in the outer surface of the one-way clutch bearing 704 portion of the one-way floating pocket plate 701 and a mating plurality of ribs 708 may be disposed on an inner sidewall of the pulley body 710 to interlock the pulley body 710 and the one-way floating pocket plate 701.

The pulley 700 also includes, as shown from left to right in FIG. 7F, a cap 714; a bushing 716, the one-way floating pocket plate 701 having a plurality of overrun stops 718; three pairs of resilient members 720; three resilient members 724; a shaft 726 having a groove 730 to fit a lock washer 738, and further having a plurality of radially outwardly extending engagement features 728 (or paddles) to interface with the overrun stops 718 via the pairs of resilient members 720 in the torque direction and via the resilient members 724 in the counter torque direction; a flat washer 742; a two-way bearing 734; an optional housing 736; and the lock washer 738.

Figure 8:
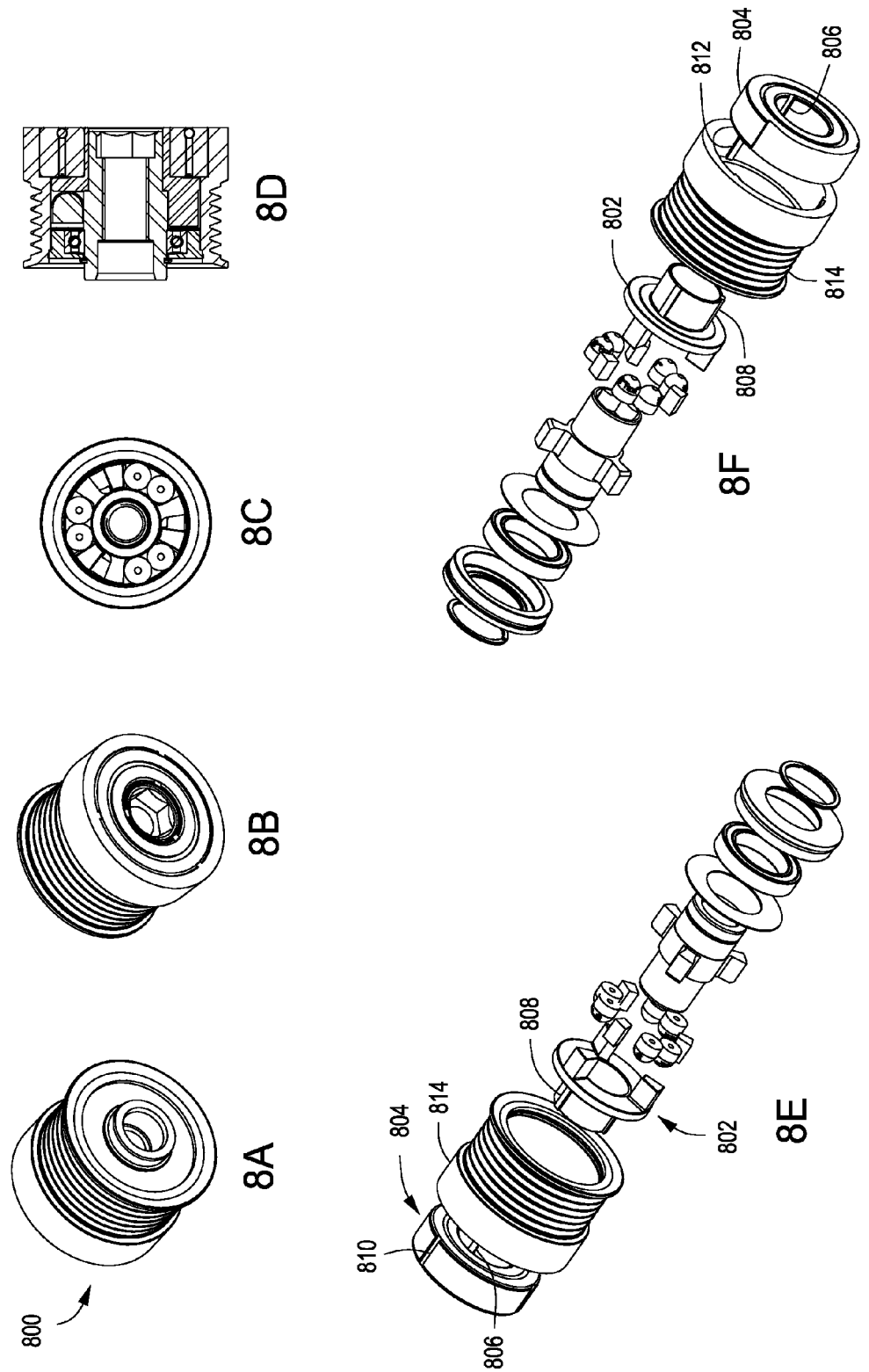
FIG. 8 depicts various views (labeled 8A-8I) of an overrunning pulley in accordance with some embodiments of the present invention.

FIG. 8 (FIGS. 8A-8I, collectively referred to as FIG. 8) depicts a pulley 800 having a similar design to the pulley 700 of FIG. 7. However, the pulley 800 separates the floating pocket plate 802 from the one-way bearing 804. Thus, where the pulley 700 depicted in FIG. 7 shows a one-piece combined pocket plate/one-way bearing (701), the pulley 800 of FIG. 8 shows a two-piece, separate floating pocket plate 802 and one-way bearing 804. The pocket plate 802 is shown interfacing with the one-way bearing 804 via slots 806 and ribs 808, but any torque transfer-enabling interface can be considered. FIGS. 8G-I illustrate a typical one-way bearing 804 having slots 806 disposed on an inner race of the bearing 804. Similar to the pulley 700 described above, the one-way bearing 804 may have slots 810 to interface with ribs 812 disposed in a pulley body 814 to rotationally couple the one-way bearing 804 to the pulley body 814. The remaining components of the pulley 800 are similar to those described above with respect to the pulley 700.

Figure 9:
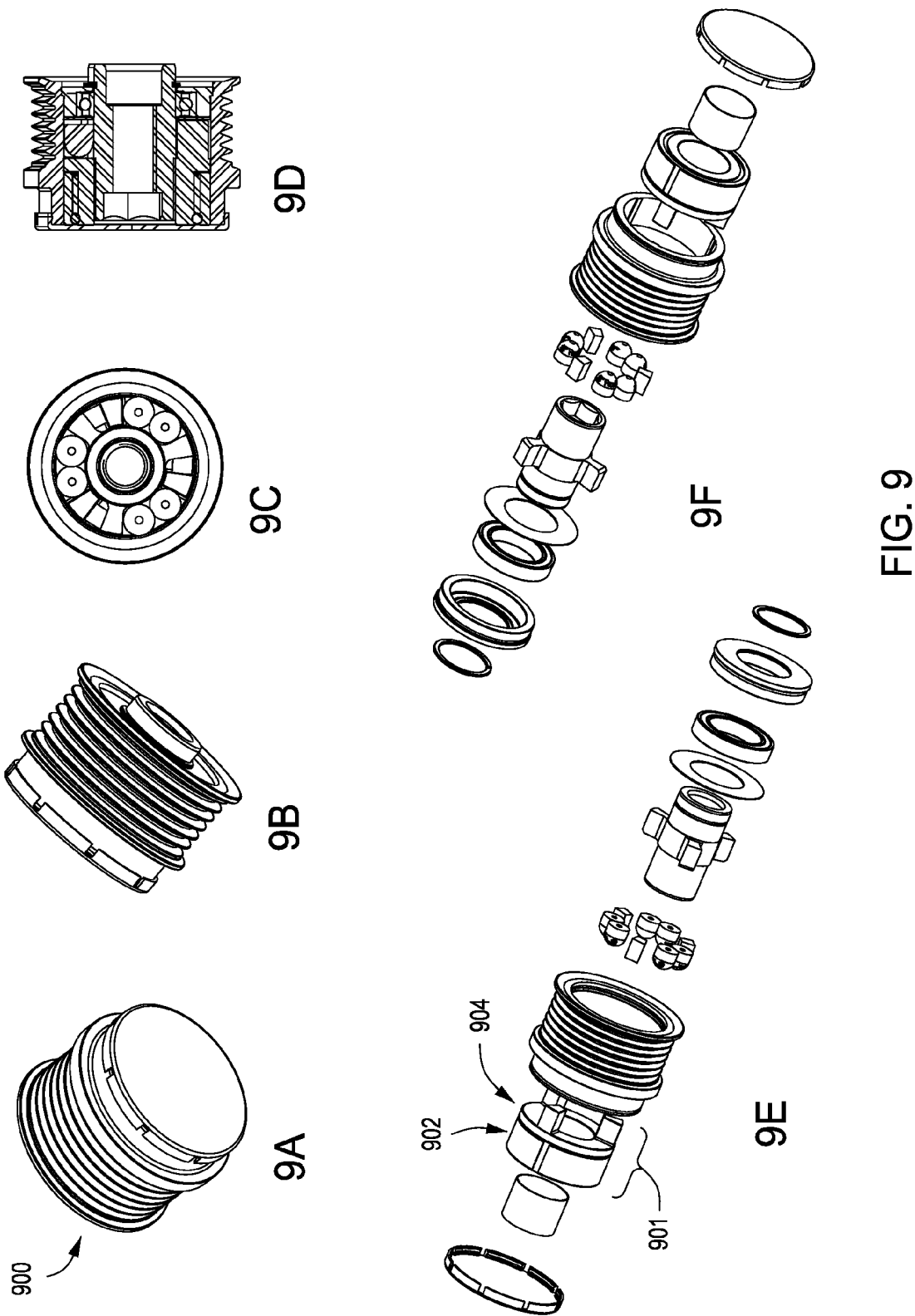
FIG. 9 depicts various views (labeled 9A-9I) of an overrunning pulley in accordance with some embodiments of the present invention.

FIG. 9 (FIGS. 9A-9I, collectively referred to as FIG. 9) depicts a pulley 900 similar to the pulley 700 described in FIG. 7. However, the pulley 900 focuses on a sprag version of a one-way bearing 902 used in combination with a floating/moveable pocket plate 904 to form a one-way floating pocket plate 901. Generally speaking, sprag bearings can handle higher overrun speeds as compared to needle bearings. The one-way floating pocket plate 901 and remaining components of the pulley 900 are similar to those described above with respect to the pulley 700.

Figure 10:
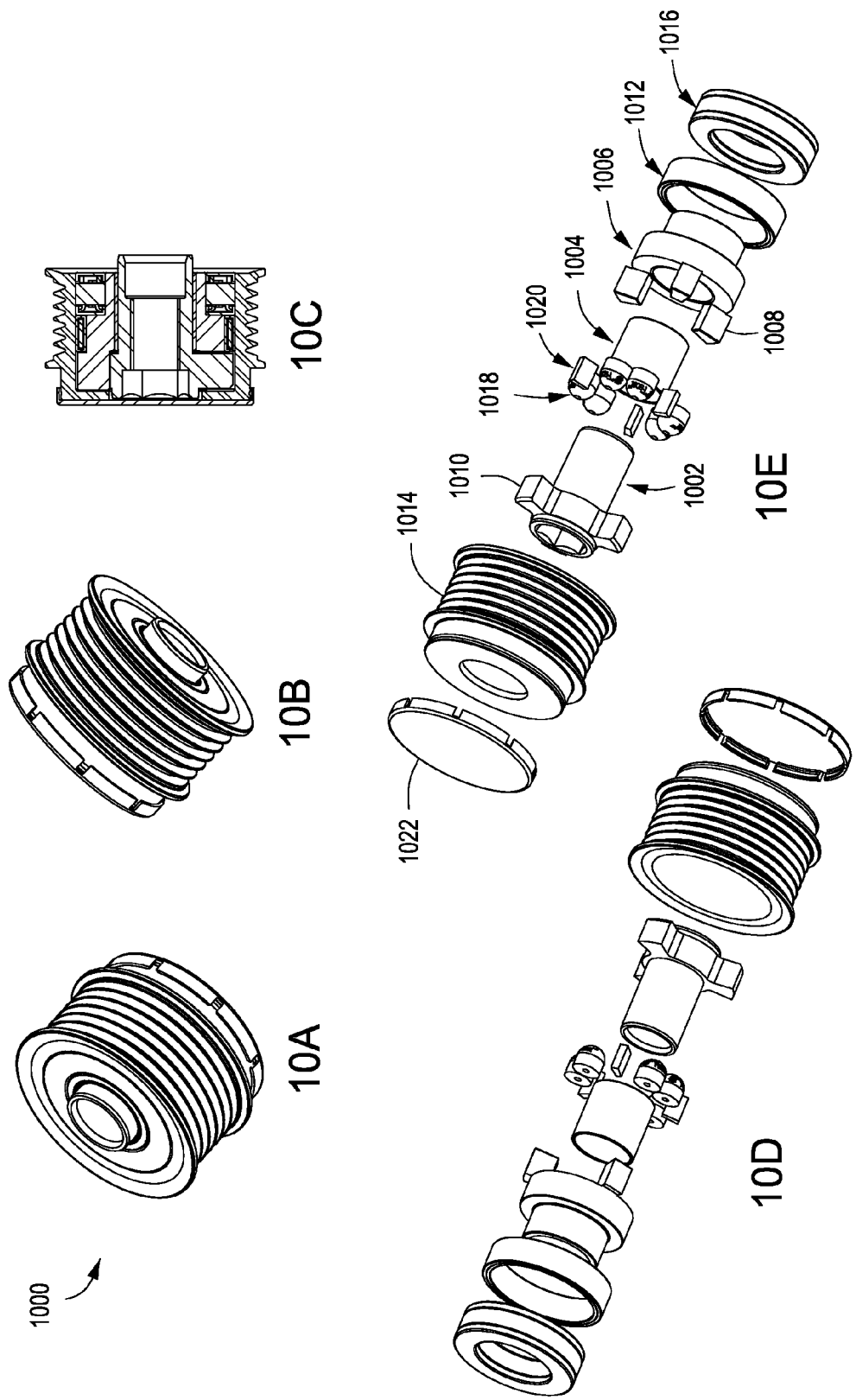
FIG. 10 depicts various views (labeled 10A-10E) of an overrunning pulley in accordance with some embodiments of the present invention.
Figure 11:
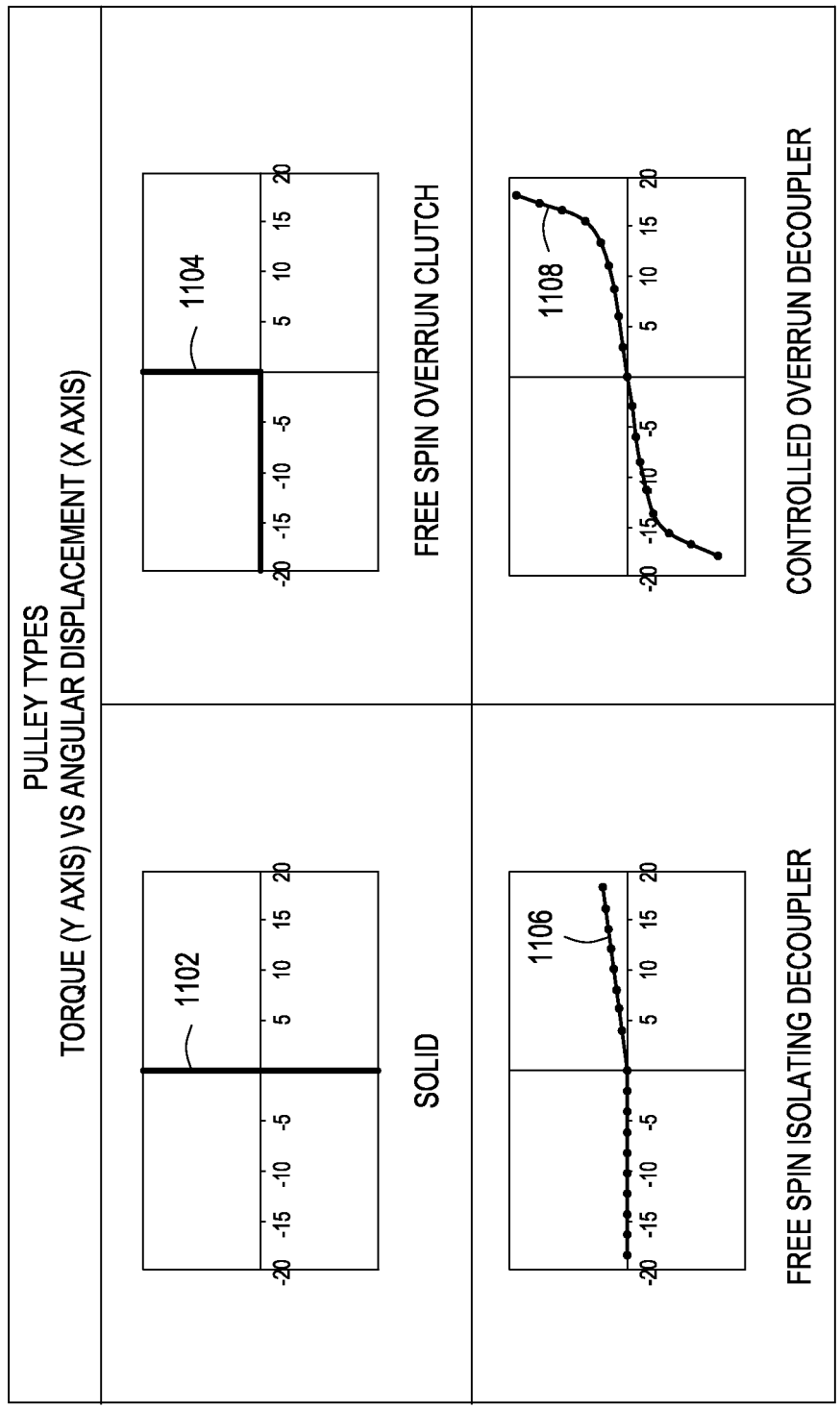
FIG. 11 depicts a graph comparing torque versus angular displacement for various conventional pulley types.

FIG. 10 (FIGS. 10A-10E, collectively referred to as FIG. 10) illustrates a pulley 1000 having a shaft 1002 whose stem may be enveloped by a journaling member such as a bushing 1004. The pocket plate 1006 then rotates about this bushing as its engagement features (e.g., paddles 1008) interact with the shaft's engagement features (e.g., paddles 1010) via resilient members 1018 in the torque direction and resilient members 1020 in the counter-torque direction (as described above). A two-way bearing 1012 may be press fit about the widest OD shoulder of the pocket plate 1006, right under the paddles 1008. This two-way bearing 1012 journals the pocket plate 1006 relative to a pulley body 1014. Subsequently, a one-way bearing 1016 fits onto the narrowest OD shoulder of the pocket plate 1006. The one-way bearing 1016 interfaces with the ID of the pulley body 1014, either transmitting torque or overrunning, depending on the direction of its rotation. Theoretically, the positions of the one-way and two-way bearings 1016, 1012 on the pocket plate 1006 may be reversed. A cap 1022 may be provided over one end of the pulley body 1014 to seal and protect the assembly.

Figure 13:
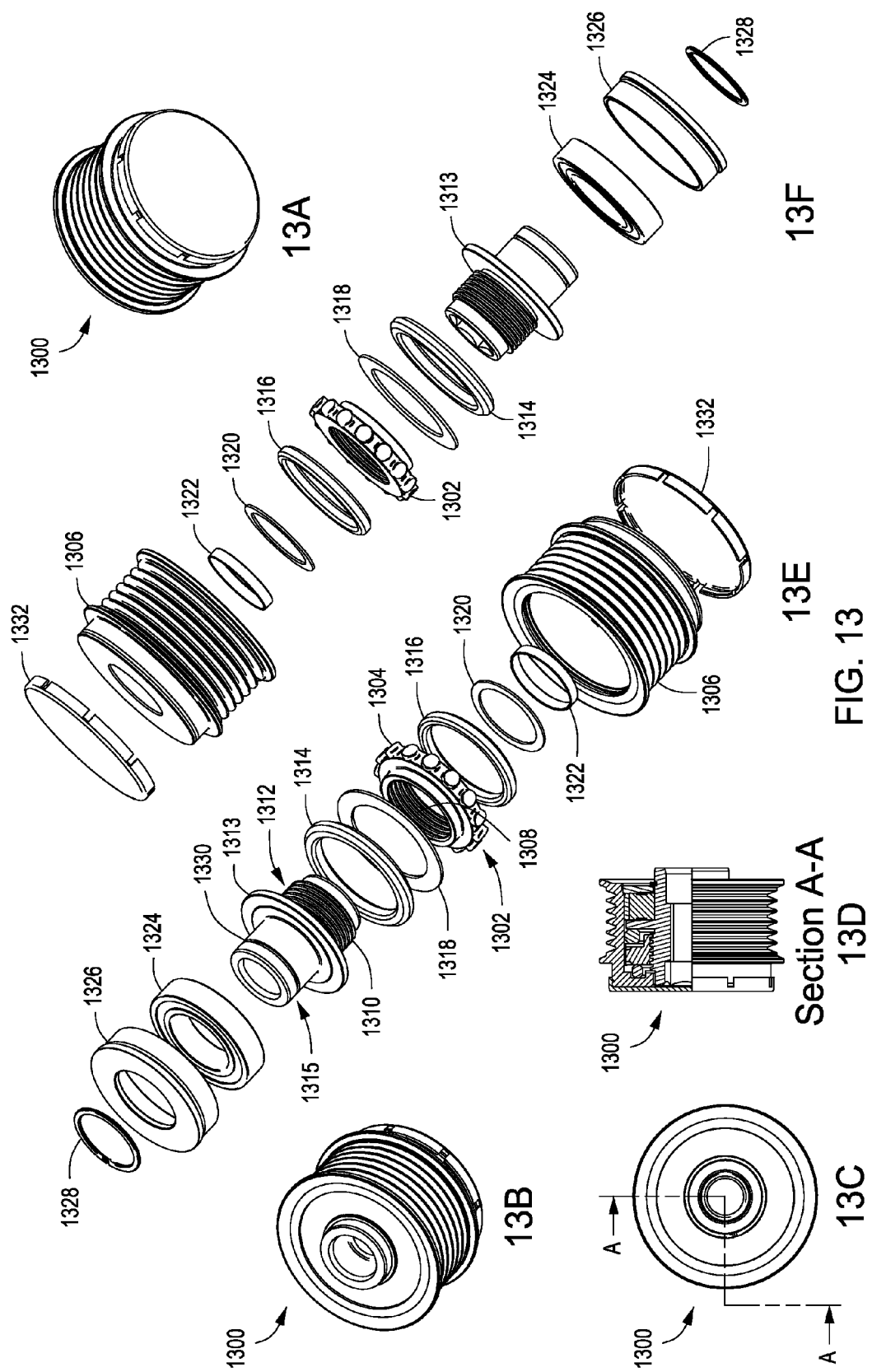
FIG. 13 depicts various views (labeled 13A-13F) of an overrunning pulley in accordance with some embodiments of the present invention.

FIG. 13 depicts various views (FIGS. 13A-13F, collectively referred to as FIG. 13) of an overrunning pulley in accordance with some embodiments of the present invention. Specifically, FIGS. 13A-B are perspective views of a pulley 1300 from opposing sides of the pulley 1300. FIG. 13C is a cross-sectional view perpendicular to the axis of rotation of the pulley 1300. FIG. 13D is a cross-sectional view along the axis of rotation of the pulley 1300. FIGS. 13E-F are exploded perspective views of the pulley 1300 from opposing sides of the pulley 1300.

The pulley 1300 depicted in FIG. 13 embodies a grooved body, partial overrun design. The pulley 1300 includes a moveable spindle 1302 having projections 1304. The projections 1304 can interface with channels (not shown) located on an inner wall of a pulley body 1306. On the driving (torque) side, the channels on the inner wall of the pulley body 1306 rotationally drive the spindle 1302 via the projections 1304. The spindle 1302 has threads 1308 that exist along an inner diameter of the spindle 1302. Mating threads 1310 are disposed on an outer diameter of a threaded end 1312 of a shaft 1313 such that when the spindle 1302 rotates relative to the shaft 1313, the spindle may advance or retreat along the shaft 1313. As the spindle 1302 advances axially up the threaded end 1312, the spindle 1302 compresses a spring 1314 (e.g., a resilient member) against a radially outwardly extending flange of the shaft 1313. A washer 1318 may be provided between the spring 1314 and the spindle 1302 to provide a flat, uniform surface for spring engagement. The spring 1314 can offer a springy response and yield gradually as torque is transferred from the pulley body 1306 to the shaft 1313 via the spindle 1302. During overrun events, such as 1-2 shifts or shutdown events, the spindle 1302 can rotate in a counter-torque direction until the spindle 1302 faces resistance from a spring 1316 disposed on an opposite side of the spindle 1302. The spring 1316 can cushion a speed changing event. A bushing 1322 may be press fit onto the threaded end 1312 of the shaft 1313 to capture the spindle 1302 on the shaft 1313. A washer 1320 may be disposed between the bushing 1322 and the spindle 1302 to provide greater surface area to retain the spindle 1302. The washer 1320 further may keep the spring 1316 from interacting with the bushing 1322. The spring 1316 may compress against the pulley body 1306 and, optionally, partially against the washer 1320 as well.

The pulley 1300 advantageously provides improved overrunning. Further, the pulley 1300 provides a springy connection in the torque direction via the spring 1314. The pulley 1300 provides a low effective spring constant over a greater angular range, because the spindle 1302 can rotate substantially as the spring 1314 engages (or the spring 1316 in the counter-torque direction). Additionally, the pulley 1300 may have improved durability because of at least one of the following: the pulley 1300 includes more spring mass and/or spring surface to cushion loads; the loads applied to the pulley 1300 are split in shear and compression (not just 100% compression); or the thread 1310 of the threaded end 1312 of the shaft 1113 produces a natural hard stop (a mechanical stop) that will not over-compress the springs 1314, 1316 beyond the mechanical limit of the springs and/or to a level that will undermine their fatigue life (e.g., the hard stop prevents compression of the springs or resilient members beyond a desired amount). Optionally, the threads 1308, 1310 and/or the channels of the pulley body 1306 may be treated, such as by being coated with titanium nitride or by being case hardened by heat treatment, to limit wear and/or fretting corrosion.

As depicted in the exploded views of FIG. 13E-F, the pulley body 1306 is hollow, having a tubular body with an outer drive surface for interfacing with a driven element, for example via a v-groove belt (although other suitable driving mechanisms may be used). The pulley body may include an inwardly extending flange (not shown), having the channels disposed in the flange. The channels can also be machined into the internal vertical face of the pulley body, and/or molded as part of the pulley body.

As can be seen in FIGS. 13A-B and 13D, the assembly generally fits compactly within the hollow pulley body 1306. The spindle 1302 fits within the hollow pulley body and the projections 1304 fit within the channels of the pulley body 1306. A two-way bearing 1324 interfaces with a non-threaded end 1315 of the shaft 1313 along an inner race of the bearing 1324 and with a housing 1326 along an outer race of the bearing 1324. The housing 1326 fits within the pulley body 1106 and is press fit or otherwise rotationally coupled thereto. A lock ring 1328 fits within a groove 1330 on the non-threaded end 1315 of the shaft 1313 to lock the assembly together and to restrict any relative axial displacement during operation between the components. A cap 1332 is disposed on the other side of the pulley body 1306 to seal and protect the assembly.

Figure 14:
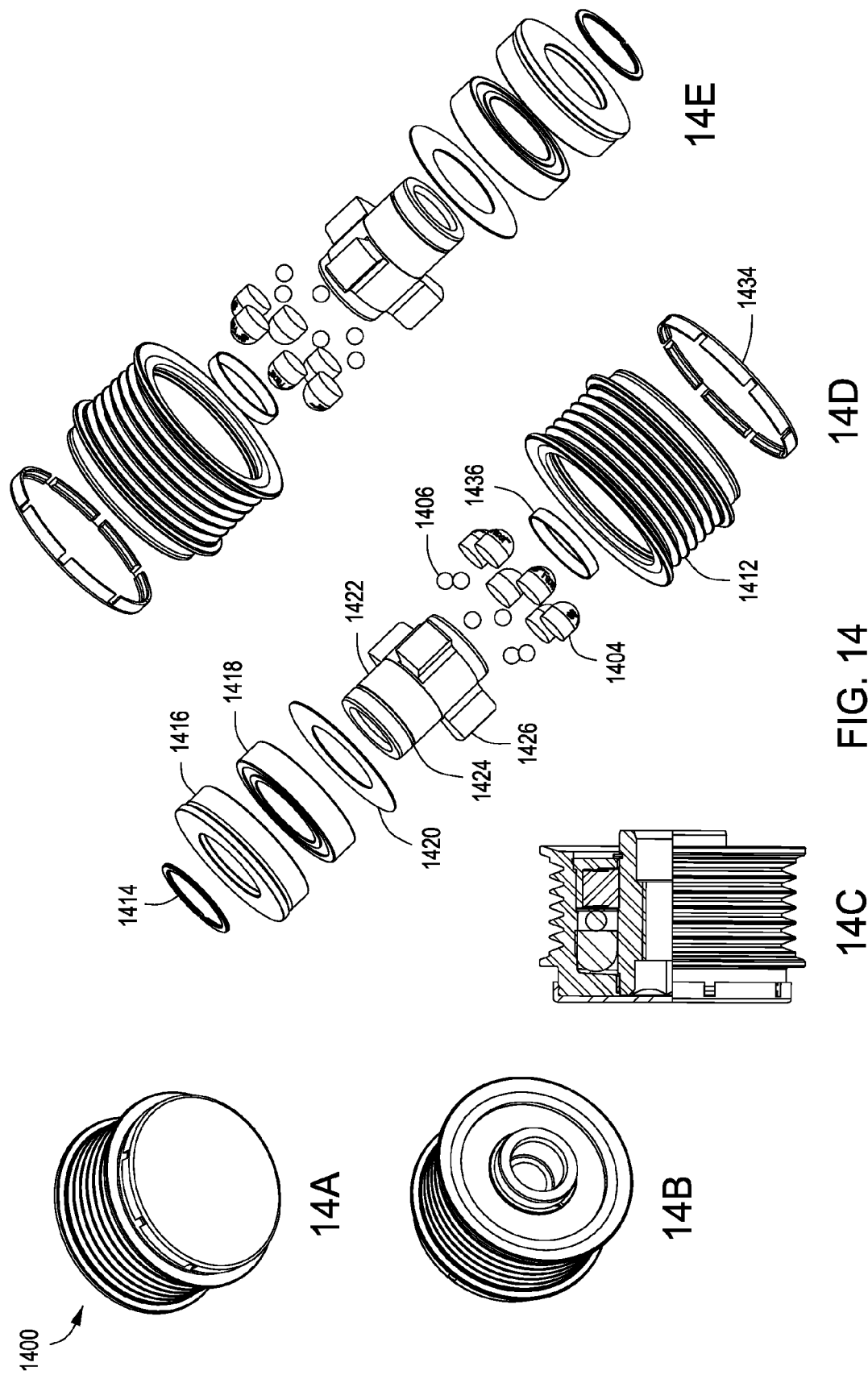
FIG. 14 depicts various views (labeled 14A-14E) of an overrunning pulley in accordance with some embodiments of the present invention.

As discussed above, one or more hard stop features may be provided to limit the range of relative rotational motion between the engagement features to prevent the engagement features from squeezing the resilient members beyond their mechanical limits. For example, during lugging engine conditions, without any hard stop features, the engagement features may otherwise provide too much force against the resilient members and may cause the resilient members to compress beyond their limits and to fail or to break. In addition to the hard stop features disclosed above, additional embodiments of hard stops incorporated into the pulley are depicted in FIGS. 14-21. FIGS. 14 and 21 also depict hard stops incorporated in variations of overrunning pulleys in accordance with some additional embodiments of the present invention. It is contemplated that the hard stops and other features disclosed with respect to FIGS. 14-21 may be incorporated into any of the other embodiments disclosed herein.

FIG. 14 depicts various views (FIGS. 14A-14E, collectively referred to as FIG. 14) of an overrunning pulley in accordance with some embodiments of the present invention. Specifically, FIGS. 14A-B are perspective views of a pulley 1400 from opposing sides of the pulley 1400. FIG. 14C is a partial cross-sectional view along the axis of rotation of the pulley 1400. FIGS. 14D-E are exploded perspective views of the pulley 1400 from opposing sides of the pulley 1400.

The pulley 1400 depicted in FIG. 14 embodies a grooved body, partial overrun design. As depicted in the exploded view of FIGS. 14D-E, the pulley 1400 includes a pulley body 1412 that is hollow, having a tubular body with an outer drive surface for interfacing with a driven element, for example via a v-groove belt (although other suitable driving mechanisms may be used). The pulley body 1412 includes inwardly extending engagement features (e.g., paddles) (not shown, but similar to those described above) that interface with corresponding engagement features (e.g., paddles 1426) formed on a shaft 1422 via resilient members 1404. The paddles can be machined into the internal vertical face of the pulley body, and/or molded as part of the pulley body. The shaft 1422 may be coupled to a remote device to be driven by rotation of the pulley body 1412. For example, the shaft 1422 may be hollow and may be keyed, splined, threaded, glued, or the like, to a shaft of the remote device, for example a rotor shaft of an alternator.

A plurality of hard stops 1406 (six shown, one corresponding to each resilient member 1404) may be provided between adjacent paddles of the pulley body 1412 and the shaft 1426. The hard stops 1406 interface with the paddles 1426 of the shaft 1422 when sufficient torque is applied to sufficiently squeeze the resilient members 1404. The size of the hard stops 1406 may vary depending upon the desired amount of compression of the resilient members 1404. In some embodiments, the hard stops 1406 that engage in the torque transfer direction may be different than the size of the hard stops 1406 that engage in the counter-torque, or overrun, direction. For example, the hard stops 1406 that engage with the paddles in the overrun direction may be smaller (to allow for greater compression of the resilient member in the counter-torque direction). In some embodiments, hard stops 1406 may be provided only to engage in the torque transfer direction, with no hard stops provided to engage in the overrun direction.

The hard stops 1406 may be fabricated from any suitable material having the required hardness and durability for the application. For example, the hard stops 1406 may be fabricated from one or more of steel, aluminum, urethane, rubber, thermoplastics, thermosets, or the like. Although depicted in FIG. 14 as being disposed on one side of the assembly (between the resilient member 1404 and a washer 1420, closer to a center of the assembly), the hard stop 1406 may be disposed in other locations as well (such as between the resilient member 1404 and a flange 1502 of the pulley body 1412, closer to an outer edge of the assembly, as depicted in FIG. 15).

In addition, although depicted in FIGS. 14-15 as spherical, the hard stops 1406 may have other geometries as well. For example, FIGS. 16A-B depict hard stops 1606 that are cylindrical, or puck-shaped. In some embodiments, and as depicted in FIGS. 17A-B, a hard stop may be provided that has an alignment feature for aligning the hard stop with the resilient member. For example, a hard stop 1706 may have a feature 1702 (such as a post) that extends from an end of the hard stop 1702 and interfaces with a mating feature 1704 (such as a cylindrical opening) disposed in the resilient member 1404. In some embodiments, the alignment features may facilitate keeping the hard stop substantially centered with respect to the resilient member.

In some embodiments, and as shown in FIG. 18, a resilient member may have an integrated hard stop feature. For example, a hard stop 1802 may be provided with an upper portion 1804 and a lower portion 1806. The upper portion 1804 may be fabricated from a material having a suitable elastomeric properties to provide a desired spring force and resiliency to cushion the engagement of the paddles in the torque direction. The lower portion 1806 may be fabricated from a material having a suitable elastomeric properties to provide a desired stopping force to prevent over-compression of the upper portion of the resilient member upon engagement of the paddles in the torque direction (e.g., the lower portion may be harder, or more rigid, than the upper portion). The upper portion 1804 may have a greater width, or greater diameter, than the lower portion 1806 to facilitate initial engagement of the upper portion of the resilient member when the respective paddles of the pulley body and the shaft move towards each other. The smaller dimension of the lower portion 1806 facilitates selective engagement of the hard stop (e.g., the lower portion) only when a desired compression of the resilient member 1802 is reached.

Figure 19B:
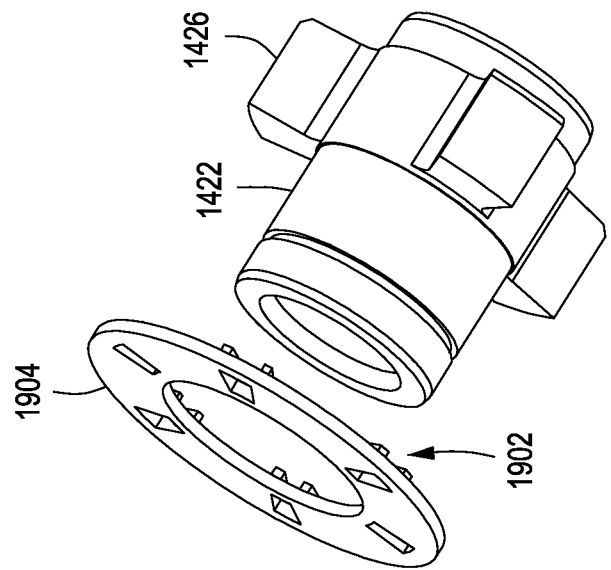
FIGS. 19A-B respectively depict partial exploded isometric views of portions of overrunning pulleys in accordance with some embodiments of the present invention.
Figure 19A:
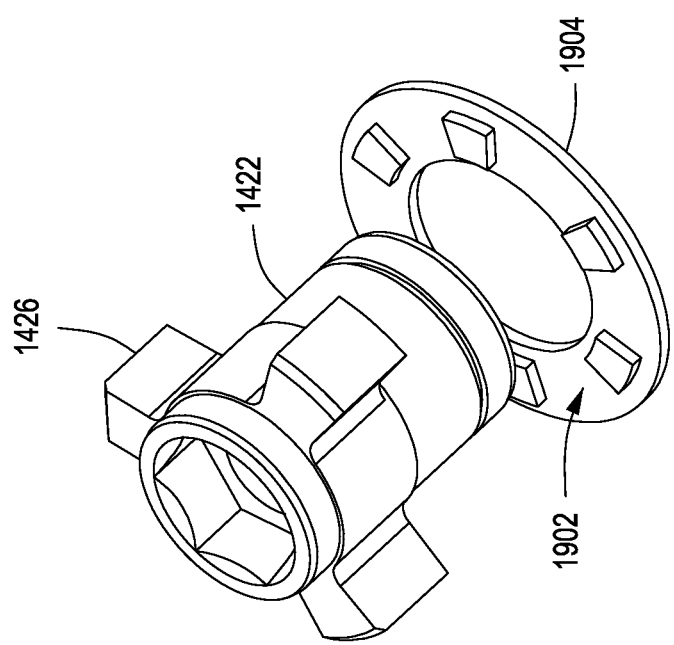

In some embodiments, rather than providing individual hard stops, a plurality of hard stops may be provided by a singular member. For example, FIGS. 19A-B depict a plurality of hard stops 1902 extending from a support 1904. The hard stops 1902 interface with the paddles 1426 of the shaft 1422 in the same manner as discussed above to limit the amount of compression of the resilient members when compressed between the paddles 1426 and the paddles of the pulley body (not shown in FIGS. 19A-B).

As shown in FIG. 19A, in some embodiments, an annular plate, or washer, may be provided with the plurality of hard stops 1902 disposed on a surface of the plate. The hard stops 1902 may be machined into the surface of the plate or coupled thereto by any suitable method, such as gluing, welding, bonding, or the like. As shown in FIG. 19B, in some embodiments, an annular plate, or washer, may have a plurality of openings punched through the washer to form the hard stops 1902.

Figure 20:
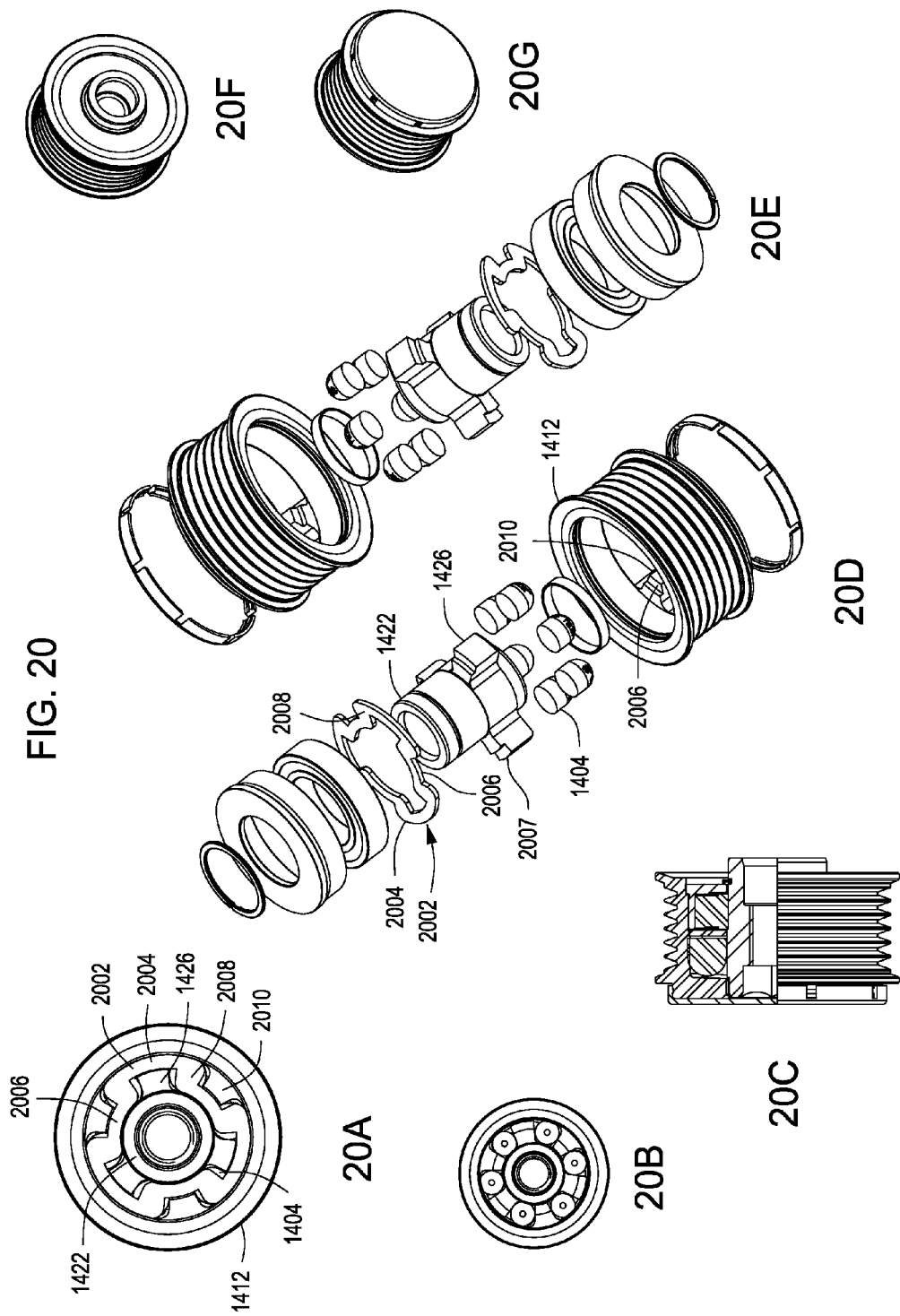
FIG. 20 depicts various views (labeled 20A-20G) of an overrunning pulley in accordance with some embodiments of the present invention.
Figure 21:
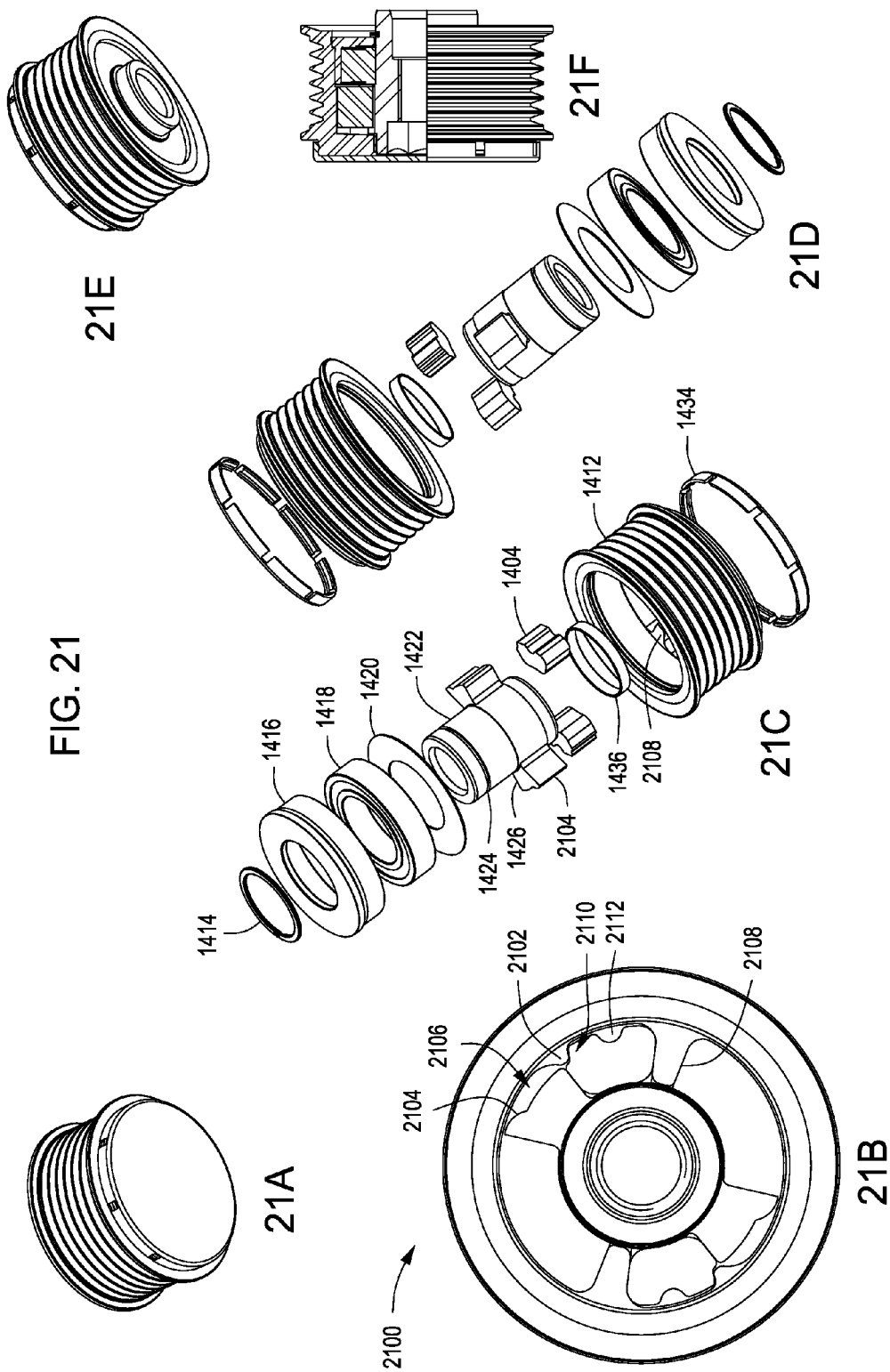
FIG. 21 depicts various views (labeled 21A-21F) of an overrunning pulley in accordance with some embodiments of the present invention.

In some embodiments, and as shown in FIG. 20 (and detailed in FIGS. 20A-20G, collectively referred to as FIG. 20), the hard stop may be provided by an annular plate 2002 having a plurality of first portions 2004 that are radially outwardly disposed relative to a plurality of second portions 2006. The plurality of first portions 2004 and plurality of second portions 2006 are coupled together via a plurality of third portions 2008. The annular plate 2002 may rest in corresponding ledges 2007 formed in the paddles 1426 of the shaft 1422 and paddles 2010 of the pulley body 1412. The angular length of the respective first portions 2004 and second portions 2006, and/or the width of the third portions 2008, may be selected to provide the desired amount of relative angular movement (e.g., rotation) between the shaft 1426 and the pulley body 1412. For example, as best seen in FIG. 20A, the pulley body 1412 and shaft 1422 may rotate with respect to one another in either direction until their respective paddles 2010, 1426 engage and compress the resilient members 1404 disposed therebetween to a sufficient degree that the paddles 2010, 1426 come into contact with the third portions 2008 of the annular plate 2002, which prevents further relative motion in that direction.

In some embodiments, and as shown in FIG. 21 (and detailed in FIGS. 21A-21F, collectively referred to as FIG. 21), the hard stop may be provided by a raised feature on the inner diameter of the pulley body. For example, FIG. 21 depicts a pulley 2100 similar to the pulley 1400 described in FIG. 14, except that the hard stop 1406 is replaced by a hard stop 2102. The hard stop 2102 may be a protrusion or raised feature extending from the inner diameter of the pulley body 1412. This raised feature interfaces with a corresponding feature 2104 having a complementary, or equal, geometry on the engagement face and/or outer portion 2106 of the shaft paddles 1426, creating a physical stop to the relative radial rotation of the paddles 1426 relative to the paddles 2108 of the pulley body 1412. The clock position of these features (e.g., the relative radial position of the paddles 2108, 1426, the hard stop 2102, and the corresponding feature 2104) are normally oriented to engage during the last 20 degrees, or less, of the possible angular compression of the resilient member before testing the material's limits. However, more generally, the configuration of the engagement features (e.g., paddles) and hard stops may be arranged such that a sufficient portion of the engagement compressive energy will be managed by the spring system (e.g., the resilient members 1404), thus slowing down the advancing paddles and thereby minimizing impact forces—and noises—of the hard stop complementary engagement features.

In some embodiments, and as depicted best in FIG. 21B, the resilient members 1404 may be configured to be retained in place with respect to the engagement features (e.g., paddles 2108) of the pulley body 1412. For example, in some embodiments, the amount of protrusion of the hard stop 2102 and the position of the hard stop 2102 may work in conjunction with the size and/or shape of the resilient member 1404 to retain the resilient member 1404 in a desired position between the hard stop 2102 and a corresponding paddle 2108. In some embodiments, the resilient member 1404 may have a feature 2110 formed to interface with the hard stop 2102 to facilitate the retention of the resilient member 1404, thereby advantageously limiting or preventing the movement of the resilient member 1404 within the cavity defined between the pulley body 1412 and the shaft 1422.

In some embodiments, the resilient member 1404 may have a volume that is less than a corresponding volume defined between the paddles 1426, 2108 when the paddles just come into contact with the resilient member 1404. For example, in some embodiments, a void 2112 may be provided by the geometry of the resilient member 1404. The void 2112 is shown on the outside of the resilient member 1404 of FIG. 21, but the void 2112 may be disposed in other locations as well, such as in the center, along other edges of the resilient member, or combinations thereof.

Figure 22:
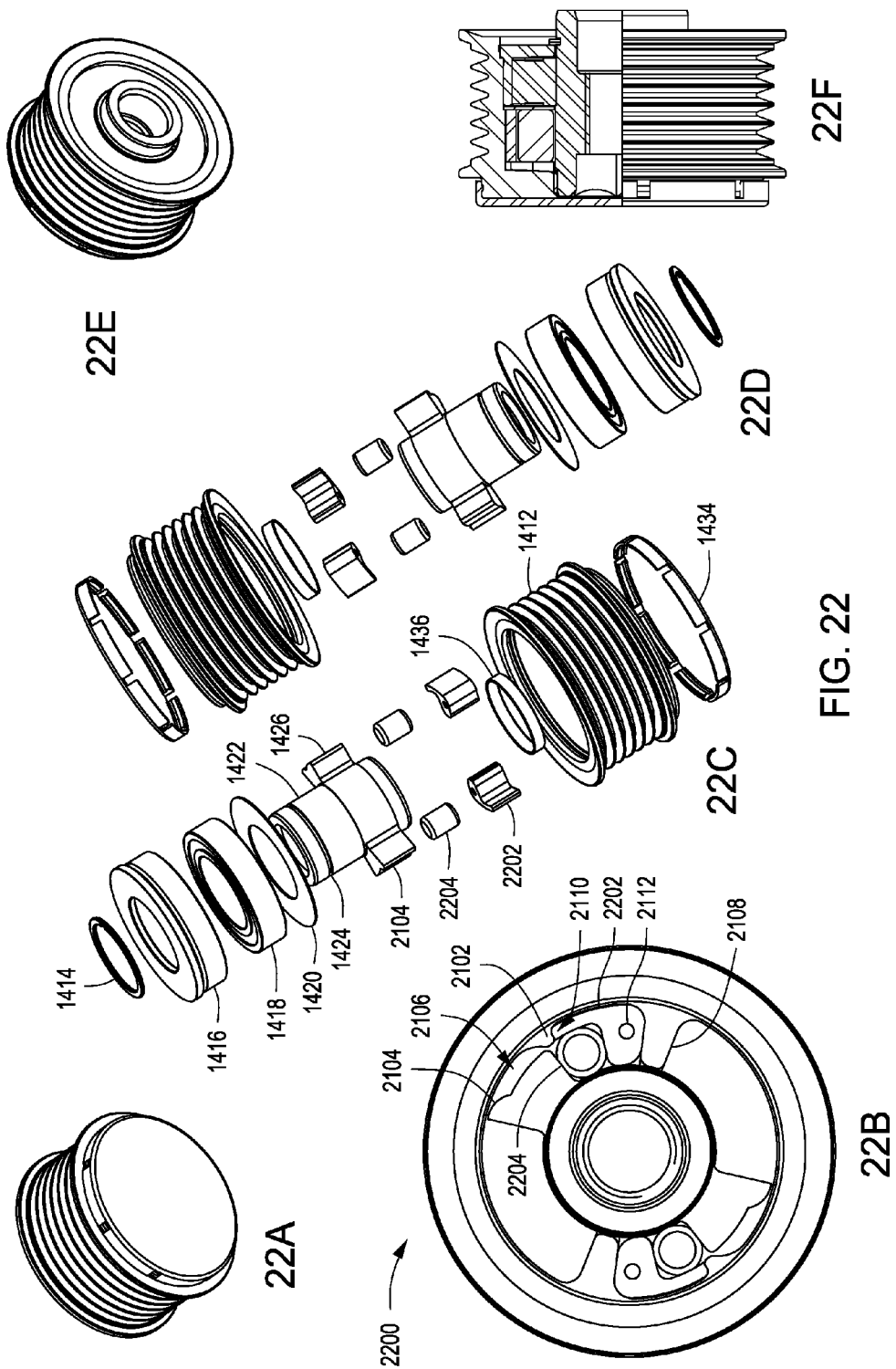
FIG. 22 depicts various views (labeled 22A-22F) of an overrunning pulley in accordance with some embodiments of the present invention.

Although the resilient member 1404 depicted in FIG. 21 is shown as a single resilient member disposed between corresponding engagement features of the pulley body and the shaft, it is contemplated that a plurality of resilient members may be disposed between each set of engagement features, or paddles. For example, FIG. 22 (detailed in FIGS. 22A-22F, collectively referred to as FIG. 22) depicts a pulley 2200 similar to the pulley 2100 described above with the exception that the resilient member 1404 is replaced with a pair of resilient members 2202, 2204. The pair of resilient members 2202, 2204 together function similarly as described above. The pair of resilient members 2202, 2204 may be independent and separate resilient members or they may be coupled together, by co-molding, bonding, or other suitable techniques. Providing multiple resilient members 2202, 2204 may advantageously reduce the risk of tearing or damaging the resilient member during compression or over numerous compression cycles.

Figure 23:
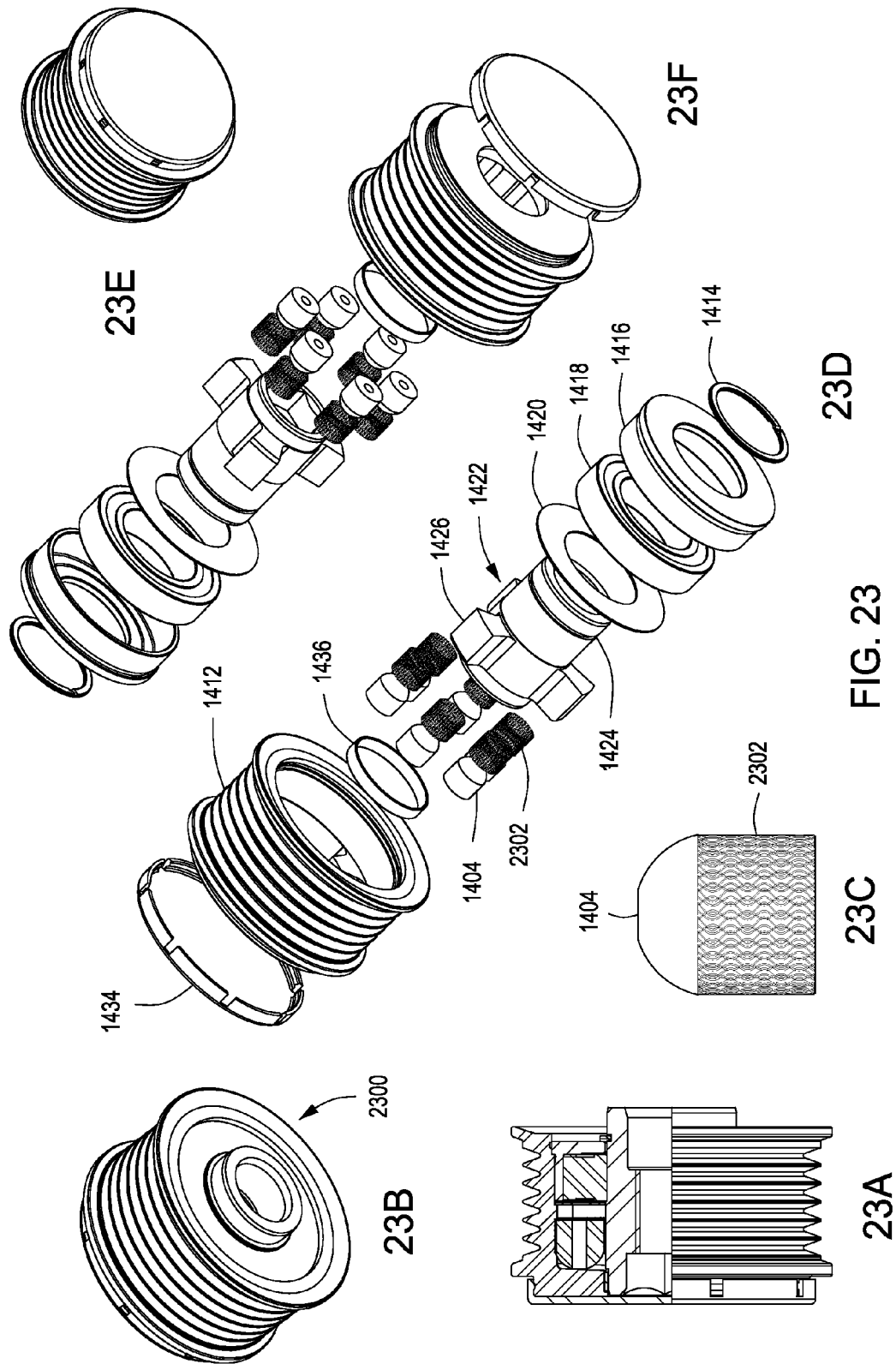
FIG. 23 depicts various views (labeled 23A-23F) of an overrunning pulley in accordance with some embodiments of the present invention.

FIG. 23 depicts a pulley 2300 similar to the pulley 1400 described in FIG. 14. However, the pulley 2300 in FIG. 23 discloses a shielded version of a resilient member. Specifically, the pulley 2300 includes hard stops 2302 in place of hard stops 1406. The hard stops 2302 may be a knitted mesh of material that can be disposed about the resilient member 1404. Examples of suitable materials for the knitted mesh include polymers, elastomers, metals, and combinations thereof and may be in the form of fibers or wires or other forms suitable for forming the knitted mesh. Each loop in the knitted mesh can act as a small spring when subjected to compressive stress. Therefore, knitted meshes—alone, as shields, or as complementary elements—may provide resilience and bounce back as long as the structure is not distorted beyond its effective yield point. For example, the knitted mesh may move freely during normal spring compressive events. However, in highly compressive events, such as in high torque events, the knitted mesh is condensed effectively into a hard stop (e.g., the knitted mesh is compressed to a point where the individual strands of the mesh support each other and prevent or limit further compression). For example, in some embodiments, the resilient member 1404 may comprise a polymer spring and may be enveloped with a loosely looped metallic mesh or hybrid metallic mesh (e.g., the hard stop 2302). In operation under a compressive event, as the spring is squeezed, the loops of the mesh will come closer together until the loops solidify and form a shield around the resilient member 1404.

Varying the knitted structure, filament or wire diameter, filament or wire material, and forming pressure can adjust the dynamic and strength characteristics of the hard stop system. In some embodiments, polymer fibers can be knitted in parallel with metal wire, in which case the metal wire acts as a structural support and binder for the polymer. In some embodiments, the mesh can be constructed to be standalone, without any polymer core or content, in which case the resilient members 1404 are not necessary and effectively replaced by the resilient characteristics of the hard stops 2302, which in such embodiments also act as the resilient members.

Returning to FIG. 14, a flat washer 1420 may be disposed over the shaft 1422 to contain the resilient members 1404 and hard stops 1406 and to separate the resilient members 104 from a bearing 1418. The bearing 1418 may be a two-way bearing that interfaces with the shaft 1422 along an inner race of the bearing 1418 and with a housing 1416 along an outer race of the bearing 1418. The housing 1416 fits within the pulley body 1412 and is press fit or otherwise rotationally coupled thereto. A lock ring 1414 fits within a groove 1424 of the shaft 1422 to lock the assembly together and to restrict any relative axial displacement during operation between the components. A bushing 1436 may be disposed over the shaft 1422 and between the shaft 1422 and the pulley body 1412 to facilitate journaling of the end of the shaft 1422 and the pulley body 1412. A cap 1434 is disposed on the other side of the pulley body 1412 to seal and protect the assembly.

Figure 12:
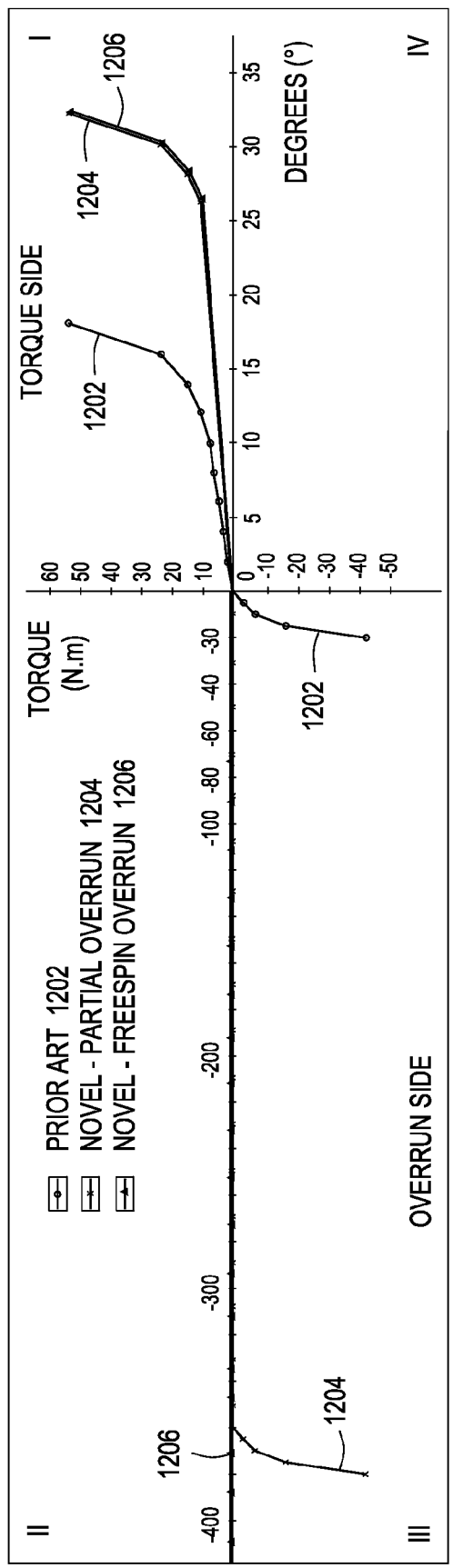
FIG. 12 depicts a graph comparing torque versus angular displacement for one conventional pulley type and several pulleys in accordance with the present invention.

Thus, overrunning pulley designs have been disclosed herein that provide an extended range of angular displacement in both to torque transfer and overrun directions. For example, FIG. 12 is a graph of angular displacement (x-axis) versus torque (y-axis) comparing a prior art controlled overrun decoupler system (line 1202) with a partial overrun (line 1204) and a freespin overrun (line 1206) in accordance with embodiments of the present invention. As can be seen in the graph, both the partial overrun (line 1204) and the freespin overrun (line 1206) pulleys of the present invention provide an increased angular displacement on the torque transfer side of the graph (quadrant I). In addition, the flat portion of the torque transfer line can have a lower slope over a large portion of the angular displacement, advantageously indicating a lower spring constant, and natural frequency, for the system. As can also be seen in the graph, both the partial overrun (line 1204) and the freespin overrun (line 1206) pulleys of the present invention provide an increased angular displacement on the overrun side of the graph (quadrant III).

Embodiments of the inventive overrunning pulley designs disclosed herein may provide additional controlled overrun as compared to conventional designs. For example, the inventive overrunning pulley designs disclosed herein may provide overrun of 20 degrees or more, or 90 degrees or more, including over 360 degrees, but still provide an eventual hard stop to avoid complete free-spin conditions. Alternatively or in combination, embodiments of the inventive overrunning pulley designs disclosed herein may also provide reduced stiffness, or a lower effective spring stiffness, during engagement/torque transfer events as compared to conventional designs. Alternatively or in combination with either of the above, embodiments of the inventive overrunning pulley designs disclosed herein may also provide improved spring durability as compared to conventional designs via additional spring mass configurations and/or mechanical stop features.

While the foregoing is directed to embodiments of the present invention, other and further embodiments of the present invention may be devised without departing from the basic scope thereof.

We claim:

1. An overrunning, isolating decoupler pulley, comprising:
   a shaft including one or more radially outwardly extending paddles coupled thereto;
   a pulley body disposed about the shaft and including one or more radially inwardly extending protrusions coupled to the pulley body, the pulley body and shaft rotatable with respect to each other in a first direction by at least a first angular displacement and in an opposing second direction by at least a second angular displacement;
   one or more engagement features that engage upon sufficient rotation between the pulley body and the shaft, wherein the one or more engagement features, when engaged, prevent further rotation between the pulley body and the shaft in a given direction;
   a resilient member disposed between the pulley body and the shaft, wherein the resilient member is compressed by the one or more engagement features of the pulley body and the shaft upon sufficient rotation between the pulley body and the shaft; and
   a hard stop comprising one or more features formed on a radially outwardly facing surface of at least one of the one or more radially outwardly extending paddles having a geometry to interface with the one or more radially inwardly extending protrusions to prevent full compression of the resilient member.

2. The pulley of claim 1:
   wherein the one or more engagement features comprise the one or more radially outwardly extending paddles coupled to the shaft and the one or more radially inwardly extending protrusions coupled to the pulley body;
   wherein the one or more radially outwardly extending paddles and the one or more radially inwardly extending protrusions engage upon sufficient rotation between the pulley body and the shaft, wherein the engagement features, when engaged, transfer torque between the pulley body and the shaft; and
   wherein the resilient member is further disposed between pairs of the one or more radially outwardly extending paddles and one or more radially inwardly extending protrusions such that the resilient member is compressed between the paddles of the shaft and the protrusions of the pulley body upon sufficient rotation between the pulley body and the shaft.

3. The pulley of claim 1, wherein the hard stop comprises a knitted mesh of material disposed about the resilient member and having a limited range of compression that is less than a range of compression of the resilient member, or wherein the hard stop and the resilient member comprise a knitted mesh of material having both resiliency and a limited range of compression to function as both the resilient member and the hard stop.

4. The pulley of claim 1, further comprising one or more features disposed between the pulley body and the shaft that retain the resilient member in a desired position relative to the engagement features of the pulley body.

5. The pulley of claim 4, wherein at least some of the one or more features disposed between the pulley body and the shaft that prevent compression of the resilient member are the same as the one or more features disposed between the pulley body and the shaft that retain the resilient member.

6. The pulley of claim 1, wherein the hard stop comprises:
a first geometry formed on an engagement surface of the radially inwardly extending protrusion; and
a complementary second geometry formed on the radially outwardly facing surface of at least one of the one or more radially outwardly extending paddles wherein the first geometry and the second geometry are configured to contact each other upon a desired amount of relative rotation between the pulley body and the shaft in a given direction to prevent further relative rotation between the pulley body and the shaft in the given direction.

7. The pulley of claim 1, wherein the amount of rotation between the pulley body and the shaft is limited in one direction of rotation and not limited in the other direction of rotation.

8. The pulley of claim 1, wherein the amount of rotation between the pulley body and the shaft is limited in both directions of rotation.

9. The pulley of claim 1, wherein the amount of rotation between the pulley body and the shaft is limited in both directions of rotation, and wherein the first angular displacement is at least 90 degrees and is in the counter-torque direction and wherein the second angular displacement is at least 15 degrees and is in the torque direction.

10. The pulley of claim 1, wherein the resilient member comprises a feature formed to interface with the radially inwardly extending protrusion of the pulley body to facilitate retention of the resilient member.

11. The pulley of claim 1, wherein a first volume is bounded by an outer surface of the shaft, an inner surface of the pulley body, the radially inwardly extending protrusion extending from the inner diameter of the pulley body, and one of the one or more shaft paddles; and wherein a second volume occupied by the resilient member is less than the first volume.

12. The pulley body of claim 1, wherein the resilient member comprises a plurality of resilient members.

* * * * *